(12) United States Patent
Yamamichi et al.

(10) Patent No.: US 7,929,688 B2
(45) Date of Patent: Apr. 19, 2011

(54) PARAMETER GENERATION APPARATUS, ENCRYPTION SYSTEM, DECRYPTION SYSTEM, ENCRYPTION APPARATUS, DECRYPTION APPARATUS, ENCRYPTION METHOD, DECRYPTION METHOD, AND PROGRAM THEREOF

(75) Inventors: Masato Yamamichi, Ota (JP); Masami Yamamichi, legal representative, Ota (JP); Satomi Yamamichi, legal representative, Ota (JP); Keiko Yamamichi, legal representative, Macbashi (JP); Yuichi Futa, Osaka (JP); Motoji Ohmori, Hirakata (JP); Makoto Tatebayashi, Takarazuka (JP)

(73) Assignee: Panasonic Corporation, Osaka (JP)

( * ) Notice: Subject to any disclaimer, the term of this patent is extended or adjusted under 35 U.S.C. 154(b) by 1561 days.

(21) Appl. No.: 10/552,586

(22) PCT Filed: Apr. 14, 2004

(86) PCT No.: PCT/JP2004/005528
§ 371 (c)(1),
(2), (4) Date: Oct. 12, 2005

(87) PCT Pub. No.: WO2004/095771
PCT Pub. Date: Nov. 4, 2004

(65) Prior Publication Data
US 2006/0239459 A1 Oct. 26, 2006

(30) Foreign Application Priority Data
Apr. 24, 2003 (JP) .................. 2003-119973

(51) Int. Cl.
*H04K 3/00* (2006.01)
*H04L 9/00* (2006.01)

(52) U.S. Cl. .............................. 380/1; 713/189; 380/44
(58) Field of Classification Search .................. 726/1–6, 726/18–19, 27, 30; 380/1, 229, 255, 259, 380/37, 42, 281–285, 29–30, 44; 713/179, 713/182, 189; 714/48–49, 51–52, 699, 701, 714/798–799, 746; 705/50
See application file for complete search history.

(56) References Cited

U.S. PATENT DOCUMENTS
4,328,645 A 5/1982 Sauer
(Continued)

FOREIGN PATENT DOCUMENTS
DE 87 02 555 U 4/1987
(Continued)

OTHER PUBLICATIONS

Tatsuaki Okamoto et al., Chapter 7.1 of "Gendai-Ango (Modern Cryptograph)", Sangyo Tosho, Jul. 7, 1997, pp. 107 and 108 and its English translation.
(Continued)

*Primary Examiner* — Hosuk Song
*Assistant Examiner* — Leynna T Truvan
(74) *Attorney, Agent, or Firm* — Wenderoth, Lind & Ponack, L.L.P.

(57) ABSTRACT

A parameter generation apparatus for generating parameters causing no decryption error for an NTRU cryptosystem so that an encrypted communication can be carried out between an encryption apparatus and a decryption apparatus in a secure and reliable manner. The parameter generation apparatus includes: a provisional parameter generation unit operable to generate a set of provisional parameters that do not cause any decryption errors, based on error condition information that is provided in advance, the error condition information indicating a condition for causing no decryption error; and an output parameter generation unit operable to generate an output parameter that does not cause any decryption errors, using the set of provisional parameters, based on a lattice constant that is calculated from the set of provisional parameters.

35 Claims, 18 Drawing Sheets

U.S. PATENT DOCUMENTS

| | | | |
|---|---|---|---|
| 6,081,597 | A | 6/2000 | Hoffstein et al. |
| 6,243,470 | B1 * | 6/2001 | Coppersmith et al. ........ 380/259 |
| 6,298,137 | B1 * | 10/2001 | Hoffstein et al. ............... 380/30 |
| 6,832,314 | B1 * | 12/2004 | Irvin .............................. 713/162 |
| 7,233,662 | B2 | 6/2007 | Futa et al. |
| 7,373,515 | B2 * | 5/2008 | Owen et al. ................... 713/182 |
| 7,519,543 | B2 * | 4/2009 | Ota et al. .................... 705/14.26 |
| 2003/0081770 | A1 | 5/2003 | Futa et al. |

FOREIGN PATENT DOCUMENTS

| | | |
|---|---|---|
| DE | 198 37 218 A | 7/1999 |
| FR | 2 316 044 A | 1/1977 |
| JP | 2003-124927 | 4/2003 |
| JP | 2003-195755 | 7/2003 |
| WO | 98/08323 | 2/1998 |

OTHER PUBLICATIONS

J. Silverman, "Wraps, Gaps, and Lattice Constants", NTRU Cryptosystems Technical Report, Report 11, online! Mar. 15, 2001, pp. 1-6, XP002288211, retrieved from the Internet: URL:http://www.ntru.com/cryptolab/pdf/NTRUTech011_v2_pdf> retrieved on Jul. 12, 2004.

J.H. Silverman et al., NTRU Cryptosystems Technical Report— Report #18, Version 1: "Estimating Decryption Failure Probabilities for NTRUEncrypt", 'online! Jun. 2003), pp. 1-17, XP002288212, retrieved from the internet: URL:http://www.ntru.com/cryptolab/pdf/NTRUTech018.pdf> retrieved on Jul. 12, 2004.

N. Howgrave-Graham et al., "The Impact of Decryption Failures on the Security of NTRU Encryption", In Proc. Crypto 2003, Santa Barbara, USA, 2003, 'online! Aug. 2004, pp. 1-22, XP002288213, retrieved from the internet: URL:http://www.ntru.com/cryptolab/pdf/cr03_ntru.pdf> retrieved on Jul. 12, 2004.

J.H. Silverman: "Dimension-Reduced Lattices Zero-Forced Lattices and the NTRU Public Key Cryptosystem," NTRU Cryptosystems Technical Report, Report 13, 'Online!, Mar. 9, 1999, pp. 1-14, XP002288214, retrieved from the internet: URL:http://www.ntru.com/cryptolab/pdf/NTRUTech013.pdf> retrieved on Jul. 12, 2004.

J. Hoffstein et al., "NTRU: A Ring-Based Public Key Cryptosystem", lecture notes in Computer Science, 1423, pp. 267-288, Springer-Verlag, 1998.

J. Silverman, "NTRU Cryptosystems Technical Report #012, Version 1", "Estimated Breaking Times for NTRU Lattices", Online!, Mar. 9, 1999, pp. 1-7, retrieved from the internet: URL:http://www.ntru.com/cryptolab/pdf/NTRUTech012.pdf> retrieved on Feb. 18, 2003.

International Search Report dated Aug. 6, 2004, issued in the International Application of which the present application is the U.S. National Stage.

European Search Report, issued Mar. 27, 2008, in a European Application that is a counterpart to the present U.S. Application.

* cited by examiner

FIG. 2

| Parameter N | Decryption time T (seconds) |
|---|---|
| 70 | 16.587 |
| 72 | 18.68 |
| 74 | 26.497 |
| 76 | 25.869 |
| 78 | 31.182 |
| 80 | 37.76 |
| 82 | 56.442 |
| 84 | 56.359 |
| 86 | 68.174 |
| 88 | 86.6 |
| 90 | 111.78 |

FIG. 3

Formula storage unit 110

| Lattice constant GL | 2.12 |
| Decryption time evaluation formula EF | $\log(T) = 0.04N - 6.2$ |
| Conditional expression ED | $6d + 2df - 1 < q/2$ |
| Initial security determination formula IF | $\log(T) = 0.2002N - 18.884$ |

FIG. 9

| Security level information SLI | Parameter set IPS |
|---|---|
| For 512-bit RSA encryption | IPS=(167, 3, 128, 61, 280, 18) |
| For 1024-bit RSA encryption | IPS=(263, 3, 128, 50, 24, 16) |
| For 2048-bit RSA encryption | IPS=(503, 3, 256, 217, 72, 55) |
| ⋮ | ⋮ |

FIG. 10

Formula storage unit 110

| Lattice constant GL | 2.12 |
| --- | --- |
| Decryption time evaluation formula EF | $\log(T) = 0.04N - 6.2$ |

| Lattice constant GL | 3.5 |
| --- | --- |
| Decryption time evaluation formula EF | $\log(T) = 0.08N - 4.8$ |

| Lattice constant GL | 4.6 |
| --- | --- |
| Decryption time evaluation formula EF | $\log(T) = 0.13N - 4.4$ |

| Conditional expression ED | $6d + 2df - 1 < q/2$ |
| --- | --- |

| Initial security determination formula IF | $\log(T) = 0.2002N - 18.884$ |
| --- | --- |

PARAMETER GENERATION APPARATUS, ENCRYPTION SYSTEM, DECRYPTION SYSTEM, ENCRYPTION APPARATUS, DECRYPTION APPARATUS, ENCRYPTION METHOD, DECRYPTION METHOD, AND PROGRAM THEREOF

BACKGROUND OF THE INVENTION

1. Technical Field

The present invention relates to an encryption technique as an information security technique, and particularly to the generation of parameters for an NTRU (a trademark of NTRU cryptosystems, Inc.) cryptosystem.

2. Description of the Related Art

Encrypted communication using public key encryption is one of the methods to realize confidential communications between a transmission apparatus and a receiving apparatus. In a public key cryptosystem, the transmission apparatus encrypts the contents of a communication using a public key of the receiving apparatus and transmits it to the receiving apparatus, and the receiving apparatus then receives the encrypted contents and obtains the original contents by decrypting it with its own private key (e.g. See Document 1: *Modern Cryptography*. Mathematics in Information Science. Ser. Tatsuaki Okamoto, and Hirosuke Yamamoto, Sangyo Tosho, 1997). In the general encryption system using this method, plural transmission apparatuses and receiving apparatuses exist. A transmission apparatus firstly acquires a public key of the destination receiving apparatus. This public key makes a pair with the private key possessed by the destination receiving apparatus and is made public in the encryption system. Then, the transmission apparatus encrypts and transmits the data to be communicated using the public key obtained as above, whereas the receiving apparatus receives such encrypted communication data, decrypts the data using its own private key, and obtains the original data.

Note that encryption, which aims at realizing confidential communications between a transmission apparatus and a receiving apparatus, is of course required to ensure security against decryption performed by third parties. In a public key cryptosystem, the following two types of decryption are possible: communication data (hereinafter referred to as "plain text") is decrypted based on encrypted communication data (hereinafter referred to as "encrypted text"); and a private key, which is privately possessed by a receiving apparatus to obtain a plain text from an encrypted text, is decrypted. In general, it is required in public key encryption that it takes a sufficiently long time for third parties to perform such decryption (e.g., it takes 1000 years by use of the latest computer), i.e., such decryption cannot be performed within a realistic time period.

In 1996, an NTRU cryptosystem was proposed as a public key encryption system capable of high-speed processing (e.g. See Document 2: Jeffery Hoffstein, Jill Pipher, and Joseph H. Silverman, "NTRU: A ring based public key cryptosystem", Lecture Notes in Computer Science, 1423, pp. 267-288, Springer-Verlag, 1998). An NTRU cryptosystem is described in detail in Document 2, and therefore no detailed description is given here. In an NTRU cryptosystem, encryption and decryption are performed using polynomial operations by which it is possible to perform operations at higher speed than in the case of RSA (Rivest Shamir Adleman) encryption in which power residue operations are performed modulo a certain natural number and ECC (elliptic-curve cryptography) in which scalar multiplications are performed on points on an elliptic curve. Therefore, an NTRU cryptosystem makes it possible to perform processing at a higher speed by use of software than in the case of existing public key encryption systems.

Thus, an encryption system using an NTRU cryptosystem as public key encryption has an advantage that processing between a transmission apparatus and a receiving apparatus is performed at a higher speed than in the case of an encryption system using an existing public key cryptosystem.

Note that in order to actually perform encryption and decryption using an NTRU cryptosystem, it is necessary to use non-negative integer parameters N, p, q, df, dg, and d (e.g. See Document 2). Presently, concrete values of these parameters are presented (e.g. See Document 5: Joseph H. Silverman, "NTRU Cryptosystems Technical Report #011, Wraps, Gaps, and Lattice Constants", [online], Jan. 21, 1999, [searched on Apr. 18, 2003]).

In an NTRU cryptosystem, a plain text and a private key are decrypted by third parties using the following methods: undertaking an exhaustive search for the plaintext and private key; and using LLL (Lenstra, Lenstra and Lovasz) algorithm (e.g. See Document 2). The use of parameters presented in Document 5, however, makes the time required for the decryption sufficiently long, as well as making an NTRU cryptosystem a secure method (e.g. See Document 3: Joseph H. Silverman, "NTRU Cryptosystems Technical Report #012, Estimated Breaking Times for NTRU Lattices", [online], Mar. 9, 1999, [searched on Feb. 18, 2003], Document 4, Joseph H. Silverman, "NTRU Cryptosystems Technical Report #013, Dimension-Reduced Lattices, Zero-Forced Lattices, and the NTRU Public Key Cryptosystem", [online], Mar. 9, 1999, [searched on Feb. 18, 2003], and Document 5).

However, there is a problem with an NTRU cryptosystem that a decrypted text does not sometimes match the original plain text even when an encrypted text is generated by encrypting the plain text with the public key, and the decrypted text is generated by decrypting such encrypted text with a valid private key (e.g. See Document 2). Such mismatch is called "decryption error". The occurrence probability of decryption errors depends on parameters for an NTRU cryptosystem (hereinafter referred to also as "NTRU parameters") (e.g. See Document 5).

Document 2 gives descriptions as to decryption error that, in order to avoid the occurrence of decryption errors, all coefficients in a polynomial (p·r×g+f×m) that is derived by computing the following polynomials must be in the range from −q/2 to q/2: a random polynomial g that is used for generating a public key polynomial h in the NTRU cryptosystem; a random number polynomial r; a plaintext polynomial m; and a private key polynomial f. However, time required for performing decryption when NTRU parameters are chosen in the above manner is unknown, and NTRU parameters that are secure against decryption and that do not cause any decryption errors are still unknown.

As described above, in an NTRU cryptosystem capable of high-speed processing, there is the case where a receiving apparatus cannot properly obtain a plaintext encrypted by a transmission apparatus in the event of a decryption error. Stated another way, an encrypted communication cannot be carried out in a reliable manner between the transmission apparatus and the receiving apparatus.

Needless to say, it is imperative in a cryptosystem that a plain text can be properly conveyed to the destination and that security is assured against decryption by third parties.

However, while the existing technique presents conditions for generating NTRU parameters that do not cause any decryption errors, such conditions are not formulated, which makes it difficult to generate NTRU parameters that do not cause any decryption errors.

Moreover, conditions for generating NTRU parameters that are secure against decryption by third parties and that do not cause any decryption errors are still unknown, and therefore it is not possible to generate such NTRU parameters. This makes it impossible for an encryption apparatus and a decryption apparatus to carry out an encrypted communication in a secure and reliable manner.

The present invention has been conceived in view of the above problems, and it is a first object of the present invention to provide a parameter generation apparatus that generates parameters causing no decryption error for an NTRU cryptosystem, so that an encryption apparatus and a decryption apparatus can carry out an encrypted communication in a secure and reliable manner.

A second object of the present invention is to provide a parameter generation apparatus that generates parameters for an NTRU cryptosystem that are secure against decryption by third parties and that do not cause any decryption errors, so that an encryption apparatus and a decryption apparatus can carry out an encrypted communication in a secure and reliable manner.

Furthermore, a third object of the present invention is to provide an encryption system, an encryption apparatus, and a decryption apparatus by which it is possible for the encryption apparatus and the decryption apparatus to carry out an encrypted communication in a secure and reliable manner by use of parameters generated by the above parameter generation apparatuses.

SUMMARY OF THE INVENTION

The parameter generation apparatus according one aspect of the present invention is a parameter generation apparatus for generating an output parameter that is a set of parameters causing no decryption error for an NTRU cryptosystem, the parameter generation apparatus comprising an error-free output parameter generation unit operable to generate the output parameter that does not cause any decryption errors, based on error condition information that is provided in advance, said error condition information indicating a condition for causing no decryption error.

The parameter generation apparatus outputs the output parameter that is a set of parameters causing no decryption error for the NTRU cryptosystem, based on the error condition information. Accordingly, no decryption error will occur, by performing encryption and decryption using the generated output parameter. This makes it possible to provide a parameter generation apparatus that generates parameters causing no decryption error for the NTRU cryptosystem.

Preferably, the error-free output parameter generation unit includes: a provisional parameter generation unit operable to generate a set of provisional parameters that do not cause any decryption errors, based on the error condition information; and an output parameter generation unit operable to generate the output parameter, using said set of provisional parameters, based on a lattice constant that is calculated from said set of provisional parameters. Moreover, it is preferable that the provisional parameter generation unit generates the set of provisional parameters that do not cause any decryption errors, based on an input parameter and the error condition information, said input parameter being a set of parameters for the NTRU cryptosystem that are inputted from outside. Furthermore, it is also preferable that the output parameter generation unit generates the output parameter, using the set of provisional parameters, based on security determination information and security level information, said security determination information being associated with the lattice constant, and said security level information indicating a level of security against decryption performed by a third party.

The parameter generation apparatus is capable of generating such an output parameter as enables the security determination information that is associated with the lattice constant to satisfy the security level information. Accordingly, it becomes possible to provide a parameter generation apparatus that generates parameters for the NTRU cryptosystem that are secure against decryption by third parties and that do no cause any decryption errors.

Preferably, the error condition information is the conditional expression for causing no decryption error that is represented as $$2 \cdot p \cdot d + 2df - 1 < q/2$$

with respect to a non-negative integer p, a non-negative integer q, a non-negative integer d, and a non-negative integer df that is for specifying the number of coefficients in a private key polynomial f whose coefficient values equal to 1, said non-negative integers being for the NTRU cryptosystem.

As described above, it is possible to formulate a condition for generating parameters that do not cause any decryption errors. Accordingly, it becomes possible to easily determine parameters that do not cause any decryption errors.

The encryption system according to another aspect of the present invention is an encryption system for generating an encrypted text by encrypting a plain text in compliance with an NTRU cryptosystem, the encryption system comprising: a parameter generation apparatus that includes an error-free output parameter generation unit operable to generate an output parameter that does not cause any decryption errors, based on error condition information that is provided in advance, said error condition information indicating a condition for causing no decryption error; a public key generation unit operable to generate a public key based on the output parameter generated by the parameter generation apparatus; and an encryption unit operable to encrypt the plain text based on the public key.

The plain text is encrypted with the public key derived from the parameters that are generated by the parameter generation apparatus. Accordingly, in the encryption system, it is possible to generate an encrypted text that is free from decryption errors.

The decryption system according to further another aspect of the present invention is a decryption system for generating a decrypted text by decrypting an encrypted text in compliance with an NTRU cryptosystem, the decryption system comprising: a parameter generation apparatus that includes an error-free output parameter generation unit operable to generate an output parameter that does not cause any decryption errors, based on error condition information that is provided in advance, said error condition information indicating a condition for causing no decryption error; a private key generation unit operable to generate a private key based on the output parameter generated by the parameter generation apparatus; and a decryption unit operable to decrypt the encrypted text based on the private key.

The encrypted text is decrypted with the private key that is derived from the parameters that are generated by the parameter generation apparatus. Accordingly, in the decryption system, it is possible to decrypt the encrypted text without causing any decryption errors.

The encryption system according to further another aspect of the present invention is an encryption system using an NTRU cryptosystem, comprising: a parameter generation apparatus for generating and outputting an output parameter that is a set of parameters causing no decryption error for the NTRU cryptosystem; a key generation apparatus for generating and outputting an encryption key and a decryption key for the NTRU cryptosystem; an encryption apparatus for generating an encrypted text by encrypting a plain text in compliance with the NTRU cryptosystem; and a decryption apparatus for generating a decrypted text by decrypting the encrypted text, wherein the parameter generation apparatus includes: a provisional parameter generation unit operable to generate a set of provisional parameters that do not cause any decryption errors, based on error condition information that is provided in advance, said error condition information indicating a condition for causing no decryption error; and an output parameter generation unit operable to generate the output parameter, using said set of provisional parameters, based on a lattice constant that is calculated from said set of provisional parameters, and output the generated output parameter, the key generation apparatus includes a generated key output unit operable to generate the encryption key and the decryption key, using the output parameter inputted from the parameter generation apparatus, and output the generated encryption key and decryption key, the encryption apparatus includes an encryption unit operable to generate the encrypted text by encrypting the plain text, using the output parameter inputted from the parameter generation apparatus and the encryption key inputted from the key generation apparatus, and the decryption apparatus includes a decryption unit operable to generate the decrypted text by decrypting the encrypted text, using the output parameter inputted from the parameter generation apparatus and the decryption key inputted from the key generation apparatus.

The parameter generation apparatus generates the output parameter that is a set of parameters causing no decryption error for the NTRU cryptosystem. The key generation apparatus generates the encryption key and the decryption key, using the generated output parameter that has been inputted. The encryption apparatus and the decryption apparatus perform encryption and decryption, using the encryption key and the decryption key, respectively. This makes it possible to provide an encryption system in which no decryption error occurs.

Note that not only is it possible to embody the present invention as a parameter generation apparatus, an encryption system, and a decryption system that include the above characteristic units, but also as a parameter generation method, an encryption method, and a decryption method that include, as their steps, such characteristic units. Moreover, it is also possible to embody the present invention as a program that causes a computer to execute such steps. It should be also noted that such a program can be distributed on recording media such as CD-ROM (Compact Disc-Read Only Memory) and over communication networks such as the Internet.

According to the present invention, it is possible to provide a parameter generation apparatus that generates parameters that are secure against decryption by a third party and that do not cause any decryption errors, in order to allow an encryption apparatus and a decryption apparatus to carry out an encrypted communication in a secure and reliable manner.

Furthermore, it is also possible for the present invention to provide an encryption system, an encryption apparatus, and a decryption apparatus by which it is possible for the encryption apparatus and the decryption apparatus to carry out an encrypted communication in a secure and reliable manner by use of parameters generated by the above parameter generation apparatus or the parameter conversion apparatus.

As described above, it is possible for the present invention to provide a parameter generation apparatus, an encryption system, and a decryption system that could not have been embodied by the existing techniques, and therefore the present invention is significantly useful.

As further information about the technical background to this application, Japanese Patent Application No. 2003-119973 filed on Apr. 24, 2003, is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a diagram showing measured data for decryption time T for a parameter N;

FIG. 3 is a diagram for explaining formulas and data stored in a formula storage unit 110 according to the first embodiment of the present invention;

FIG. 9 is a diagram showing security level information and a parameter set for an NTRU cryptosystem that achieves the security level indicated by such security level information;

FIG. 10 is a diagram for explaining formulas and data stored in the formula storage unit 110 according to a variation (1) of the present invention;

DETAILED DESCRIPTION OF THE INVENTION

Figure 1:
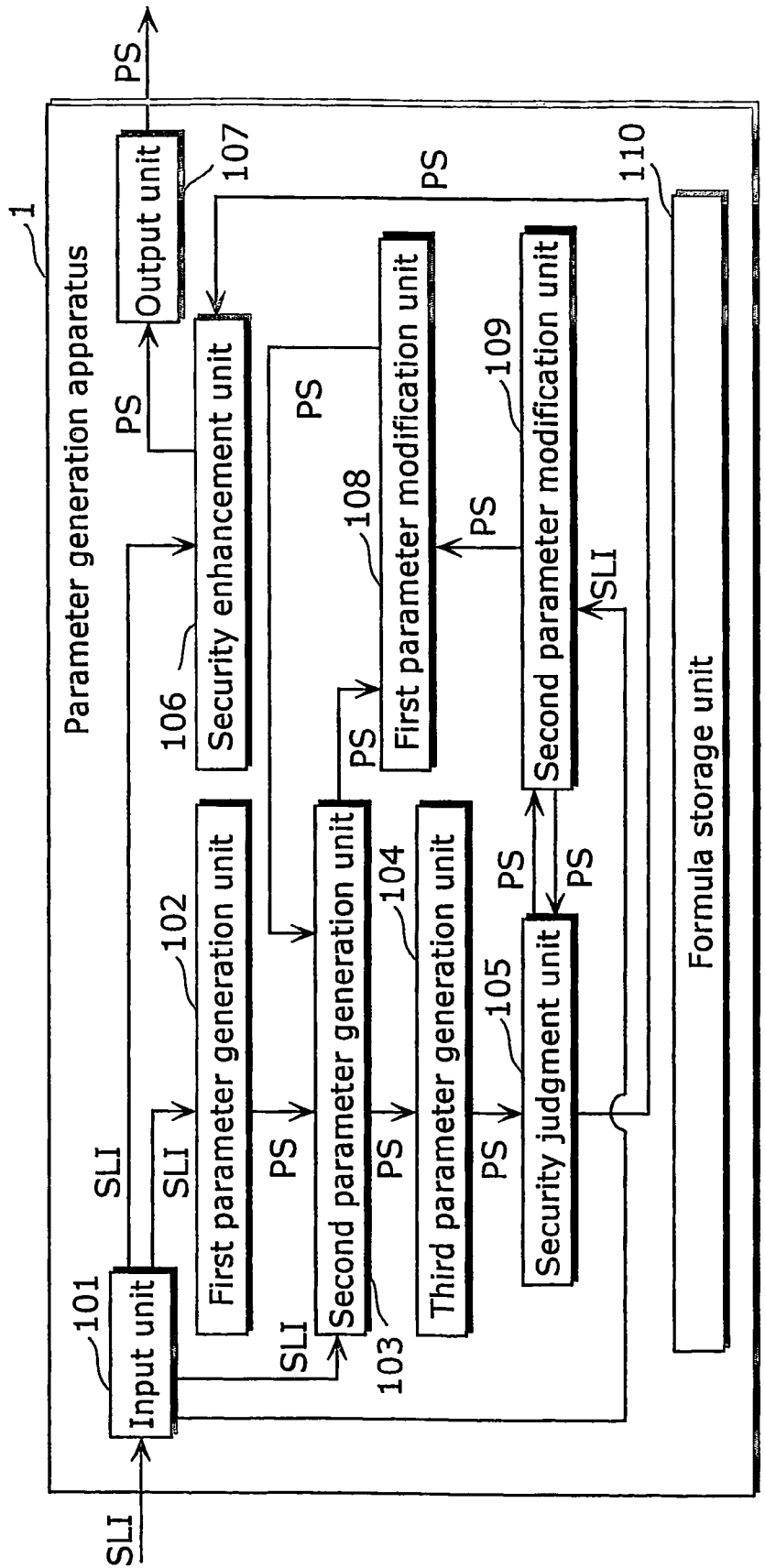
FIG. 1 is a diagram showing a configuration of a parameter generation apparatus 1 according to a first embodiment of the present invention.

The following describes the embodiments of the parameter generation apparatus and parameter conversion apparatus according to the present invention with reference to the drawings.

The parameter generation apparatus and parameter conversion apparatus according to the present invention handle parameters for an NTRU cryptosystem (hereinafter also referred to as "NTRU parameters"). An NTRU cryptosystem is described in detail in Document 2, and therefore only a brief description is given here.

(1) NTRU Parameters

An NTRU cryptosystem uses non-negative integer parameters N, p, q, df, dg, and d. The following are three examples of NTRU parameters presented in Document 2: (N, p, q, df, dg, and d)=(107, 3, 64, 15, 12, and 5); (N, p, q, df, dg, and d)=(167, 3, 128, 61, 20, and 18); and (N, p, q, df, dg, and d)=(503, 3, 256, 216, 72, and 55).

The meanings of the respective parameters are described below.

(i) Parameter N

An NTRU cryptosystem is a public-key encryption system for performing encryption and decryption by performing polynomial operations. The degree of polynomials used in an NTRU cryptosystem is determined by the parameter N.

Polynomials used in an NTRU cryptosystem are integer coefficient polynomials of degree (N−1) or lower for the parameter N. If N=5, for example, a polynomial is $X^4+X^3+1$, and the like. Here, "X^a" denotes the "a"th power of X. Moreover, a public key h, a private key f, a plain text m, a random number r, and an encrypted text c used for encryption or decryption are each represented by a polynomial of degree (N−1) or lower (these are hereinafter referred to as a public key polynomial h, a private key polynomial f, a plaintext polynomial m, a random number polynomial r, and an encrypted text polynomial c, respectively).

A polynomial is computed so that the result of a computation always gives a polynomial of degree (N−1) or lower, using the relational expression "X^N=1" for the parameter N. When N=5, for example, letting that a product of a polynomial and a polynomial be "x" and that a product of an integer and a polynomial (or a product of an integer and an integer) be "·", a product of the polynomial $X^4+X^2+1$ and the polynomial $X^3+X$ is as follows, using the relational expression "X^5=1", so that it always becomes a polynomial of degree (N−1) or lower:

$(X^4+X^2+1)\times(X^3+X)$ $=X^7+2 \cdot X^5+2 \cdot X^3+X$ $=X^2 \times 1+2 \cdot 1+2 \cdot X^3+X$ $=2 \cdot X^3+X^2+X+2.$ (ii) Parameters p and q An NTRU cryptosystem uses non-negative integer parameters p and q. As is described in Document 2, these parameters p and q must be relatively prime.

(iii) Parameters df, dg, and d

The choice of a private key polynomial f handled in an NTRU cryptosystem, a random polynomial g that is used together with the private key polynomial f at the time of generating a public key polynomial, and a random number polynomial r used for encrypting a plain text, depends on the respective parameters df, dg, and d.

First, a private key polynomial f is chosen whose df coefficients equal to "1", (df−1) coefficients equal to "−1", and the other coefficients equal to "0". In other words, a random number polynomial f is a polynomial of degree (N−1) or lower having N coefficients that range from coefficients of degree 0 (constant term) to degree (N−1). A random number polynomial f is chosen whose df coefficients equal to "1", (df−1) coefficients equal to "−1", and (N−2df+1) coefficients equal to "0" out of the above N coefficients.

Meanwhile, a random polynomial g is chosen whose dg coefficients equal to "1", dg coefficients equal to "−1", and the other coefficients equal to "0". Furthermore, a random number polynomial r is chosen whose d coefficients equal to "1", d coefficients equal to "−1", and the other coefficients equal to "0".

(2) Decryption Errors in NTRU Cryptosystem

In an NTRU cryptosystem, when an encrypted polynomial c is generated by encrypting a plaintext polynomial m, it is possible to obtain that a decrypted polynomial m', by decrypting the encrypted polynomial c, which does not match the plaintext polynomial m. In this case, the plaintext polynomial m cannot be obtained properly at the time of decryption. This is mismatch is called a decryption error.

Document 2 describes that a decryption error occurs when a coefficient value of any one of the degrees in the polynomial (p·r×g+f×m) that is obtained by computing the following polynomials is not in the range from −q/2 to q/2: a random polynomial g that is used for generating a public key polynomial h; a random number polynomial r; a plaintext polynomial m; and a private key polynomial f. The use of the above three parameters presented in Document 2 causes a decryption error, as described in Document 5, although its occurrence probability is small (the order of $10^{(-5)}$).

First Embodiment

The following describes the parameter generation apparatus 1 according to the first embodiment of the present invention.

<Overview of Parameter Generation Apparatus 1>

Referring to FIG. 1, the overview of the parameter generation apparatus 1 is first described.

The following is provided to this parameter generation apparatus 1 in advance: a lattice constant GL for an NTRU cryptosystem having certain parameters; a decryption time evaluation formula EF for the NTRU cryptosystem having the above lattice constant GL; a conditional expression ED for generating parameters that do not cause any decryption errors; and an initial security determination formula IF.

This parameter generation apparatus 1 receives, as an input from outside, security level information SLI indicating a security level to be achieved in the NTRU cryptosystem. The parameter generation apparatus 1 is an apparatus capable of generating a parameter set PS for the NTRU cryptosystem that (i) achieves the security level indicated by the security level information SLI against decryption by means of an exhaustive search and decryption using the LLL algorithm and (ii) does not cause any decryption errors, by use of the lattice constant GL, decryption time evaluation formula EF, conditional expression ED, and initial security determination formula IF that are provided in advance, and outputs the generated parameter set PS to the outside.

This is the overview of the parameter generation apparatus 1, but the parameter generation apparatus 1 is described in detail after the description is given of how the lattice constant GL, decryption time evaluation formula EF, conditional expression ED, and initial security determination formula IF are provided.

<Lattice Constant GL, Decryption Time Evaluation Formula EF, and Conditional Expression ED>

Here, the details are first given of the lattice constant GL, decryption time evaluation formula EF, and conditional expression ED for generating parameters that do not cause any decryption errors, which is followed by the description of how they are provided.

A decryption time evaluation formula EF in the NTRU cryptosystem for evaluating decryption time T needed to decryption using the LLL algorithm, is determined by the NTRU parameters df, dg and q, and is classified depending on the value of a lattice constant GL computed from the parameters df, dg, and q. Document 3 describes that a lattice constant GL is derived as follows from the NTRU parameters df, dg, and q:

$$GL=(4 \cdot pi \cdot e \cdot |f| \cdot |g|/q)^{\wedge}(0.5).$$

Document 3 further describes that there exist certain constants A and B for an NTRU cryptosystem having these parameters df, dg, and q when this lattice constant GL is fixed, and decryption time T needed to perform decryption using the LLL algorithm satisfies the following decryption time evaluation formula EF for the parameter N:

$$EF: \log(T) \geq A \cdot N + B.$$

Here, "log(T)" denotes a natural logarithm of the decryption time T. Moreover, "pi" denotes a circle ratio, "e" denotes a natural logarithm base, "|f|" denotes the norm of the private key polynomial f, and "|g|" denotes the norm of the random polynomial g. More specifically, $$|f|=(2 \cdot df-1)^{\wedge}(0.5),$$

and $$|g|=(2 \cdot df)^{\wedge}(0.5).$$

Note that Document 3 describes that the constants A and B in the above decryption time evaluation formula EF can be obtained by actually measuring decryption time T when the value of the parameter N is small and then by making approximations using the measured piece of data.

Meanwhile, Document 4 describes that the decryption in an NTRU cryptosystem using the LLL algorithm becomes more difficult with the increase in the size of the value of a lattice constant GL. Here, assume that, for the value of a certain lattice constant GL1, $$EF1: \log(T) \geq A \cdot N + B \text{ (}A \text{ and } B\text{: constants)}$$

is provided as a decryption time evaluation formula EF1 for evaluating decryption time T needed to perform decryption using the LLL algorithm in an NTRU cryptosystem having parameters df, dg, and q that are used to determine the value of the lattice constant GL1. According to the above discussion, if the value of a lattice constant GL to be derived from other parameters df, dg, and q is larger than the value of the above lattice constant GL1, it is possible to know that decryption time T needed to perform decryption in an NTRU cryptosystem having such other parameters df, dg, and q satisfies at least the above decryption time evaluation formula EF1.

Document 2 describes that decryption is performed correctly and no decryption error occurs if all coefficients in the polynomial (p·r×g+f×m) that is derived in the decryption process of the NTRU cryptosystem are in the range from $-q/2$ to $q/2$.

First, the values of the respective parameters df, dg, and q are determined. Here, assume that df=34, dg=34, and q=512, for example. Then, the value of the lattice constant GL is derived using these parameters df, dg, and q, and such lattice constant GL is provided to a formulation storage unit 110 in advance. In the above example, the lattice constant GL is GL=2.12.

Next, a decryption time evaluation formula EF for evaluating decryption time T needed to perform decryption in the NTRU cryptosystem having the parameters df, dg, and q, is determined in the following manner, and the determined decryption time T is then stored into the formulation storage unit 110 in advance.

More precisely, the decryption time evaluation formula EF is a formula by which it is possible to exactly estimate decryption time T needed to perform decryption in the NTRU cryptosystem using the LLL algorithm without underestimating it, when the value of the lattice constant GL determined from the parameters df, dg, and q is 2.12 or greater.

(i) Derive Decryption Time T when Parameter N Takes Small Value

First, using the method presented in Document 3, a measured piece of data for decryption time T in the case of using the LLL algorithm is experimentally determined with respect to the determined parameters df, dg, and q. Here, each piece of measured data for decryption time T shown in FIG. 2 is computed by a computer having a processing rate of 1000 MIPS, and decryption times T are in seconds. Note that MIPS (Million Instruction Per Second) indicates the processing power of a computer, and 1MIPS means that a computer is capable of executing one million instructions per second. The present example indicates that it was possible to measure the decryption times for the respective values 70~90 as the parameter N.

(ii) Derive Decryption Time Evaluation Formula by Approximation

Next, using a piece of measured data derived in (i), the constants A and B in the following decryption time evaluation formula EF are determined:

$$EF: \log(T)=A \cdot N + B.$$

These constants A and B are determined, for example, by determining the coefficients A and B in $Y=A \cdot X+B$ by least squares, where $X=N$, and $Y=\log(T)$.

Here, in the case of the measured data for decryption time T shown in FIG. 2, the constants A and B are approximately 0.093 and −3.8, respectively.

Basically, the following decryption time evaluation formula EF that is determined by the above method, may be provided to the formula storage unit 110:

$$EF: \log(T)=0.093N-3.8.$$

However, in the first embodiment to be described in detail below, the value of decryption time T in the decryption time evaluation formula EF is treated as a MIPSyear-value. Note that MIPSyear indicates the throughput of a computer, and 1MIPSyear is the amount of processing that a computer capable of performing processing at a rate of 1MIPS can handle per year.

Thus, the above derived decryption time evaluation formula EF should be transformed here into a formula in which decryption time T is represented by a MIPSyear-value. According to the method described in Document 3, the decryption time T representing a MIPSyear-value is determined by multiplying the decryption time T by the value indicating the processing power 1000MIPS of a computer that has computed the measured data, and then by dividing the result by the number of seconds of a year, 31557600 (1 year=365.25 days).

More specifically, letting T'=1000T/31557600, the following transformed decryption time evaluation formula EF is determined by substituting T' into the above decryption time evaluation formula EF:

EF: long($T'$)=0.093N−14.2.

This transformed decryption time evaluation formula EF is provided to the formula storage unit 110.

Note that the method of least squares is a known technique, and therefore no detailed description is given here.

Next, a description is given of how the conditional expression is provided.

First, assume that p=3, and dg>d. The value of p here is a typical value of an NTRU parameter.

At this time, the following conditional expression ED is provided to the formula storage unit 110 in advance:

ED: 6·$d$+2·$df$−1<$q$/2.

This conditional expression is a conditional expression for generating parameters that do not cause any decryption errors in theory.

The reason is described below.

Firstly, as described above, no decryption error occurs if all coefficients in the polynomial p·r×g+f×m are within the range from −q/2 to q/2.

Here, taking the polynomial r×g, its product will be represented as follows, as described in Document 2, when a coefficient of degree k in the polynomial a is represented by a(k):

(r×g)(k)

=$r$(0)·$g$(k)+$r$(1)·$g$(K−1)+ . . .

+r(N−1)·g(k−(N−1)(mod N)).

And, the random number polynomial r is a polynomial whose d coefficients equal to "1", d coefficients equal to "−1", and the other coefficients equal to "0". Moreover, the random polynomial g is a polynomial whose dg coefficients equal to "1", dg coefficients equal to "−1", and the other coefficients equal to "0".

Thus, since the value of the coefficient (r×g)(k) of degree k in the polynomial r×g is dg>d, the coefficient (r×g)(k) is represented as (r×g)(k)

=1·$g$(i1)+1·$g$(i2)+ . . . +1·$g$(id)

−1·$g$(j1)−1·$g$(j2)− . . . −1·$g$(jd).

As above, the coefficient (r×g)(k) is represented by d number of 1·g(in) terms (1≦n≦d) and d number of −1·g(jn) terms (1≦n≦d).

Thus, (r×g)(k) takes on the maximum value when all g(in)s equal to 1 (1≦n≦d), and all g(jn)s equal to −1 (1≦n≦d). What is more, such value is 2d at greatest (the smallest value is not more than −2d).

Here, since p=3, it is evident from the above that the value of the largest coefficient in the polynomial p·r×g+f×m is 3·2d+2df−1 at greatest. Furthermore, if such largest coefficient is not greater than q/2, all the coefficients in the polynomial p·r×g+f×m are within the range from −q/2 to q/2, and so no decryption error occurs.

Thus, the following conditional expression ED is derived:

ED: 6·$d$+2·$df$−1<$q$/2.

According to the above discussion, no decryption error occurs in theory, if this conditional expression is satisfied.

<Initial Security Determination Formula IF>

In order to choose parameters df, dg, and d that are secure against decryption by means of an exhaustive search, the parameter generation apparatus 1 is first required to choose, in the first parameter generation unit 102, the parameter N that is large enough to meet the security level information SLI (a detailed description is given later).

To this end, an example of the initial security determination formula IF to be used here is an evaluation formula, described in Document 3, for evaluating the decryption time needed to perform decryption using the LLL algorithm in an NTRU cryptosystem in the case where df=61, dg=20, and q=128. More specifically, the initial security determination formula IF is represented as IF: log($T$)=0.2002N−18.884.

This initial security determination formula IF is provided to the formula storage unit 110 in advance.

The initial security determination formula IF is a formula to be obtained by transforming log(T)=0.2002N−7.608 that is an evaluation formula for evaluating the decryption time needed to perform decryption using the LLL algorithm in an NTRU cryptosystem in the case where df=61, dg=20, and q=128, so that T indicates a MIPSyear value.

Next, detailed descriptions are given of the parameter generation apparatus 1.

<Configuration of Parameter Generation Apparatus 1>

As FIG. 1 shows, the parameter generation apparatus 1 is comprised of the input unit 101, the first parameter generation unit 102, the second parameter generation unit 103, the third parameter generation unit 104, the security judgment unit 105, the security enhancement unit 106, the output unit 107, the first parameter modification unit 108, the second parameter modification unit 109, and the formula storage unit 110. The following describes each of these constituent elements.

(1) Input Unit 101

The input unit 101 receives security level information SLI from the outside, and outputs such security level information SLI to the first parameter generation unit 102, the second parameter generation unit 103, and the security enhancement unit 106, and the second parameter modification unit 109.

Here, the security level information SLI is information that indicates the security level in encryption to be achieved and that indicates, for example, that the security level of encryption is equivalent to that of 1024-bit RSA encryption. Here, the security level information SLI shall be, for example, the amount of processing performed in a decryption algorithm. The following descriptions are given on the assumption that SLI is (10^12) MIPSyear.

(2) First Parameter Generation Unit 102

The first parameter generation unit 102 receives the security level information SLI from the input unit 101, reads the initial security determination formula IF from the formula storage unit 110, and chooses the parameter N for the NTRU cryptosystem that is large enough to meet the security level information SLI. Then, taking the value of the parameter q as p=3 and the values of the other parameters q, df, dg, and d as 0 provisionally, the first parameter generation unit 102 generates a parameter set PS=(N, p, q, df, dg, and d), using the chosen parameter N, and outputs such parameter set PS to the second parameter generation unit 103.

More specifically, the parameter N is chosen so that the value of the initial security determination formula IF meets the security level indicated by the security level information SLI.

For example, letting the security level information SLI be (10^12) MIPSyear and the initial security determination formula IF stored in the formula storage unit 110 be $$IF: \log(T)=0.2202N-18.884,$$

N=233 is derived by computing the following formula in which the security level information SLI is substituted into T:

$$IF: \log(10^{\wedge}12)=0.2002N-18.884.$$

(3) Second Parameter Generation Unit 103

The second parameter generation unit 103 receives the parameter set PS from the first parameter generation unit 102 or the first parameter modification unit 108, and receives the security level information SLI from the input unit 101. Then, the second parameter generation unit 103 derives a parameter candidate set DS based on the parameter N included in the parameter set PS, using a method to be described below. The second parameter generation unit 103 then judges whether or not there is a sufficient number of elements in the parameter candidate set DS for choosing the parameters df, dg, and d (e.g. whether the number of elements is 3 or more). When there is not a sufficient number of elements, the second parameter generation unit 103 outputs the parameter set PS to the first parameter modification unit 108. When there is a sufficient number of elements, on the other hand, the second parameter generation unit 103 chooses the parameters df, dg, and d from the parameter candidate set DS. Then, using these parameters df, dg, and d, the parameter generation unit 103 newly generates a parameter set PS=(N, p, q, df, dg, and d), and outputs it to the third parameter generation unit 104.

The following describes a method for deriving a parameter candidate set DS and a method for choosing the parameters df, dg, and d.

(i) Method for Deriving Parameter Candidate Set DS

The second parameter generation unit 103 derives a parameter candidate set DS that satisfies the following inequality, in relation to the security level information SLI and the parameter N:

$$(C(N,k)\cdot C(N-k,k))^{\wedge}(0.5) \geq SLI,$$

where integers k are ($1 \leq k \leq N$). Here, "C(a, b)" denotes the number of combination patterns for choosing b numeric values out of a numeric values.

A parameter candidate set DS is derived in a manner described below, for example. The second parameter generation unit 103 chooses k in ascending order starting from k=1 to k=N/2, and substitutes each selected k into the left side in the above inequality. The second parameter generation unit 103 treats all ks that satisfy this inequality as elements of the parameter candidate set DS.

Note that, as described in Document 5, the left side of the above inequality represents the decryption time needed to decrypt a private key for the NTRU cryptosystem by an exhaustive search when dg=k (or df=k), whereas it represents the decryption time needed to decrypt a plaintext for the NTRU cryptosystem by an exhaustive search when d=k. Stated another way, by choosing the parameters df, dg, and d from the parameter candidate set DS here, a parameter candidate set DS is derived that enables decryption times for decrypting the plaintext and private key by an exhaustive search to satisfy the security level indicate by the security level information SLI inputted to the input unit 101.

(ii) Method for Choosing Parameters df, dg, and d

The second parameter generation unit 103 randomly chooses, from the parameter candidate set DS, parameters df, dg, and d that satisfy dg>d. Here, the second parameter generation unit 103 randomly chooses, from the parameter candidate set DS, parameters that satisfy df>dg>g, and assigns them to df, dg, and d.

Note that the parameter candidate set DS includes a sufficient number of elements for choosing parameters df, dg, and d, when N is a sufficiently large value. Taking SLI=10^12, DS does not include any elements when N=10, but DS={8, 9, 10, 11, 12} (five integers from 8 to 12) when N=30, whereas DS={4, 5, 6, . . . , 50} (47 integers from 4 to 50) when N=100.

(4) Third Parameter Generation Unit 104

The third parameter generation unit 104 receives the parameter set PS from the second parameter generation unit 103, and reads, from the formula storage unit 110, the conditional expression ED for generating parameters that do not cause any decryption errors. Then, the third parameter generation unit 104 chooses, as a parameter q, the smallest parameter q that satisfies the conditional expression ED in relation to the parameters df, dg, and d included in the parameter set PS, and that serves as a power of 2. Finally, the third parameter generation unit 104 newly generates a parameter set PS=(N, p, q, df, dg, and d) using the chosen parameter q, and outputs the generated parameter set PS to the security judgment unit 105.

For example, letting df=50, dg=24, and d=16, the conditional expression ED $$ED: 6d+2df-1<(q/2)$$

gives q>294. Since 512 is the smallest q that satisfies this conditional expression q>294 and q=2^i (i is a natural number), the parameter q is treated as q=512. Note that the reason that the parameter q shall be a power of 2 is because the parameter p (p=3) and parameter q to be chosen are required to be relatively prime. That the parameters p and q are relatively prime is a condition for serving as NTRU parameters p and q, as described in Document 2.

(5) Security Judgment Unit 105

The security judgment unit 105 receives the parameter set PS from the third parameter generation unit 104 or the second parameter modification unit 109. The security judgment unit 105 derives, from the following formula, a lattice constant SL for the NTRU cryptosystem having the parameters N, p, q, df, and dg in the parameter set PS, using the parameters df, dg, and q:

$$SL: (4\cdot pi\cdot e\cdot |f|\cdot |g|/q)^{\wedge}(0.5).$$

Here, "pi" denotes a circle ratio, "e" denotes a natural logarithm base, "|f|"=(2df-1)^(0.5), and "|g|"=(2dg)^(0.5).

The security judgment unit 105 reads the lattice constant GL from the formula storage unit 110, and outputs the parameter set PS to the security enhancement unit 106, when GL≦SL. If GL>SL, the security judgment unit 105 outputs the parameter set PS to the second parameter modification unit 109.

(6) Security Enhancement Unit 106

The security enhancement unit 106 receives the parameter set PS from the security judgment unit 105, as well as the security level information SLI from the input unit 101, and reads the decryption time evaluation formula EF from the formula storage unit 110. Furthermore, the security enhancement unit 106 derives decryption time T needed to perform decryption in the NTRU cryptosystem from the parameter N in the parameter set PS and the decryption time evaluation formula EF.

For example, taking the decryption time evaluation formula EF as

EF: $\log(T)=0.0093N-14.2$, where N=400, the decryption time T is approximately $9.7 \times 10^9$.

The security enhancement unit 106 judges whether or not the above-derived decryption time T achieves the security level indicated by the security level information SLI, by judging whether or not the following is satisfied:

T≧SLI.

If T<SLI, the security enhancement unit 106 increases the parameter N so that the decryption time T satisfies T≧SLI, and newly generates a parameter set PS=(N, p, q, df, dg, and d) using the increased parameter N.

For example, the security enhancement unit 106 generates the new parameter set PS by deriving the parameter N through the computation of the following formula that is obtained by substituting the security level information SLI into T in the decryption time evaluation formula EF:

EF: $\log(SLI)=0.040N-6.2$.

The security enhancement unit 106 judges whether the parameter N in the parameter set PS is a prime number or not. When the parameter N is not a prime number, the security enhancement unit 106 increases the parameter N so that the increased parameter N becomes a prime number, and generates a new parameter set PS=(N, p, q, df, dg, and d) using such increased parameter N.

For example, in the case where PS=(450, 3, 512, 50, 24, and 16), although the parameter N satisfies N=450, it is not a prime number. Therefore, the security enhancement unit 106 generates the new parameter set PS=(451, 3, 512, 50, 24, and 16) using, as a new value of the parameter N, 451 that is the smallest of all the prime numbers exceeding 450.

It is known that the security level in an NTRU cryptosystem is lowered if the value of the parameter N is a composite number, which makes it necessary for the above processing to be performed in order to avoid this. Note that a method for judging whether the parameter N is a prime number or not is described in Document 1, and therefore a description of this method is not given here.

Finally, the security enhancement unit 106 outputs the parameter set PS to the output unit 107.

(7) Output Unit 107

The output unit 107 receives the parameter set PS from the security enhancement unit 106, and outputs it to the outside.

(8) First Parameter Modification Unit 108

The first parameter modification unit 108 receives the parameter set PS from the second parameter generation unit 103 or the second parameter modification unit 109, and increases the parameter N in such parameter set PS. Here, N shall be increased by 10, for example. Then, the first parameter modification unit 108 generates a new parameter set PS=(N, p, q, df, dg, and d) using the increased parameter N, and outputs the generated parameter set PS to the second parameter generation unit 103.

(9) Second Parameter Modification Unit 109

The second parameter modification unit 109 receives the security level information SLI from the input unit 101, as well as the parameter set PS from the security judgment unit 105, and generates a parameter candidate set DS, as in the case of the second parameter generation unit 103. The second parameter modification unit 109 compares the parameter dg in the parameter set PS with the maximum value M of all the elements in the parameter candidate set DS. If dg<M, the second parameter modification unit 109 changes the parameter dg to a value that is larger than the maximum element included in the parameter candidate set DS, and generates a new parameter set PS=(N, p, q, df, dg, and d) using the changed parameter dg, and outputs the generated parameter set PS to the security judgment unit 105. Meanwhile, when dg≧M, the second parameter modification unit 109 outputs the parameter set PS to the first parameter modification unit 108.

(10) Formula Storage Unit 110

As FIG. 3 shows, the formula storage unit 110 stores, in advance, the lattice constant GL, the decryption time evaluation formula EF, the conditional expression ED for generating parameters that do not cause any decryption errors, and the initial security determination formula IF. Here, assume that

GL=2.12 is provided as the lattice constant GL,

EF: $\log(T)=0.93N-14.2$ is provided as the decryption time evaluation formula EF, ED: $6d+2df-1<(q/2)$ is provided as the conditional expression ED, and IF: $\log(T)=0.2002N-18.884$ is provided as the initial security determination formula IF.

Here, the decryption time evaluation formula EF is, as described above, a formula by which it is possible to exactly estimate decryption time T needed to perform decryption using the LLL algorithm without underestimating it, when the value of the lattice constant derived from the parameters df, dg, and q, is equal to or greater than the value of the above lattice constant GL (in this case, 2.12 or greater).

Also, the conditional expression ED is, as described above, a formula indicating a condition for parameters that do not cause any decryption errors. Meanwhile, the initial security determination formula IF is a formula to be used for choosing, in the first parameter generation unit 102, the parameter N that is large enough to meet the security level information SLI, in preparation for choosing parameters df, dg, and d that are secure against decryption by means of an exhaustive search.

<Operation of Parameter Generation Apparatus 1>

Figure 4:
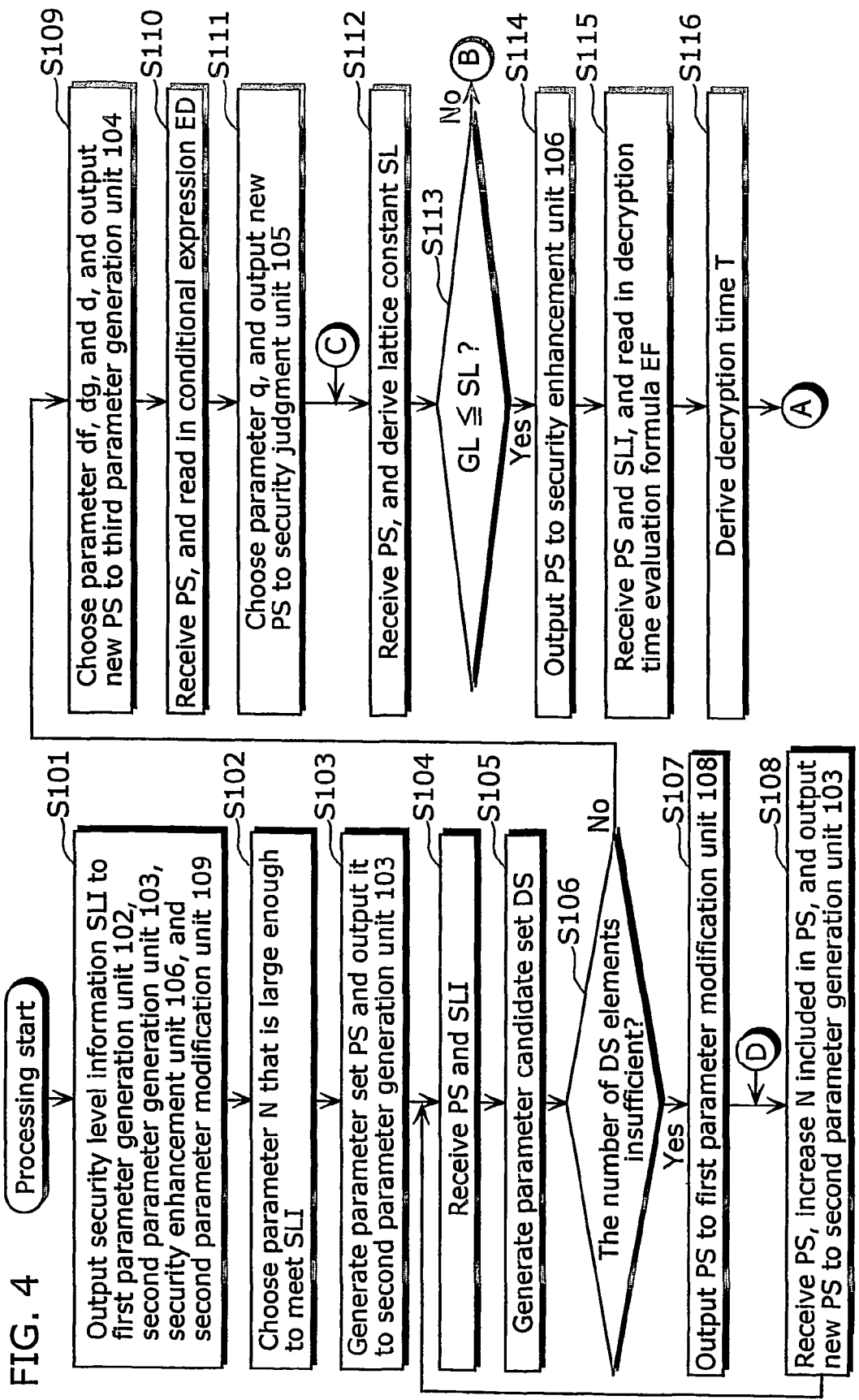
FIG. 4 is a flowchart showing the former part of processing performed by the parameter generation apparatus 1 according to the first embodiment of the present invention.
Figure 5:
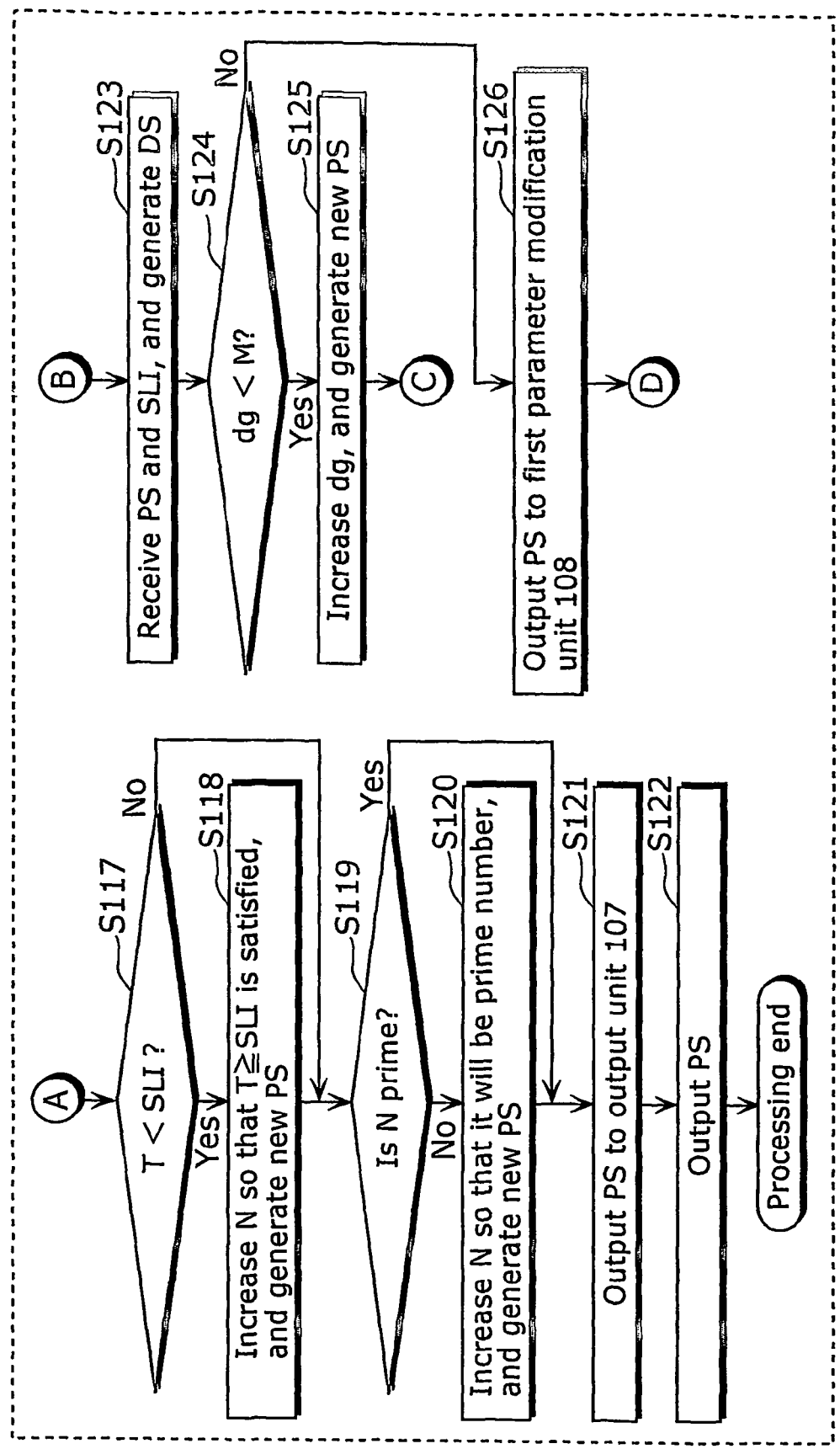
FIG. 5 is a flowchart showing the latter part of the processing performed by the parameter generation apparatus 1 according to the first embodiment of the present invention.

Referring to the flowcharts shown in FIGS. 4 and 5, the operation of the parameter generation apparatus 1 with the above configuration is described.

The parameter generation apparatus 1, which is provided in advance with a lattice constant GL for an NTRU cryptosystem having certain parameters, a decryption time evaluation formula EF for the NTRU cryptosystem having the above lattice constant GL, and a conditional expression ED for generating parameters that do not cause any decryption errors, performs the following operation upon receipt of security level information SLI from outside.

The input unit 101 receives the security level information SLI from outside, and outputs such security level information SLI to the first parameter generation unit 102, the second parameter generation unit 103, the security enhancement unit 106 and the second parameter modification unit 109 (Step S101).

The first parameter generation unit 102 receives the security level information SLI from the input unit 101, reads the initial security determination formula IF from the formula storage unit 110, and chooses the parameter N for the NTRU cryptosystem that is a value large enough to meet the security level information SLI (Step S102).

Then, taking the parameter p=3 and the values of the other parameters q, df, dg, and d as provisionally 0 for the chosen parameter N, the first parameter generation unit 102 generates a parameter set PS=(N, p, q, df, dg, and d), and outputs such parameter set PS to the second parameter generation unit 103 (Step S103).

The second parameter generation unit 103 receives the parameter set PS from the first parameter generation unit 102 or the first parameter modification unit 108, and receives the security level information SLI from the input unit 101 (Step S104).

The second parameter generation unit 103 generates a parameter candidate set DS (Step S105).

Then, the second parameter generation unit 103 judges whether or not there is a sufficient number of elements in the DS to choose parameters df, dg, and d (Step S106).

When there is not a sufficient number of DS elements (Yes in Step S106), the second parameter generation unit 103 outputs the parameter set PS to the first parameter modification unit 108 (Step S107).

The first parameter modification unit 108 receives the parameter set PS from the second parameter generation unit 103 or the second parameter modification unit 109, increases the parameter N included in such parameter set PS, generates a new parameter set PS=(N, p, q, df, dg, and d) using the increased parameter N, and outputs the generated parameter set PS to the second parameter generation unit 103. The processing is then returned to Step S104 (Step S108).

When there is a sufficient number of elements (No in Step S106), the second parameter generation unit 103 chooses the parameters df, dg, and d from the parameter candidate set DS. Then, using the chosen parameters df, dg, and d, the second parameter generation unit 103 newly generates a parameter set PS=(N, p, q, df, dg, and d), and outputs the generated parameter set PS to the third parameter generation unit 104 (Step S109).

The third parameter generation unit 104 receives the parameter set PS from the second parameter generation unit 103, and reads, from the formula storage unit 110, the conditional expression ED for generating parameters that do not cause any decryption errors (Step S110).

Then, the third parameter generation unit 104 chooses, as a parameter q, the smallest parameter q that satisfies the conditional expression ED in relation to the parameters df, dg, and d included in the parameter set PS and that serves as a power of 2. Finally, the third parameter generation unit 104 newly generates a parameter set PS=(N, p, q, df, dg, and d) using the chosen parameter q, and outputs the generated parameter set PS to the security judgment unit 105 (Step S111).

The security judgment unit 105 receives the parameter set PS from the third parameter generation unit 104 or the second parameter modification unit 109, and derives a lattice constant SL for the NTRU cryptosystem having the parameters N, p, q, df, and dg in the parameter set PS (Step S112).

The security judgment unit 105 reads the lattice constant GL from the formula storage unit 110, and judges whether or not GL$\leq$SL is satisfied (Step S113).

If GL$\leq$SL (Yes in Step S113), the security judgment unit 105 outputs the parameter set PS to the security enhancement unit 106 (Step S114).

The security enhancement unit 106 receives the parameter set PS from the security judgment unit 105, as well as the security level information SLI from the input unit 101, and reads the decryption time evaluation formula EF from the formula storage unit 110 (Step S115).

Furthermore, the security enhancement unit 106 derives decryption time T needed to perform decryption in the NTRU cryptosystem from the parameter N in the parameter set PS and the decryption time evaluation formula EF (Step S116).

The security enhancement unit 106 judges whether or not the above-derived decryption time T satisfies T<SLI (Step S117).

If T<SLI (Yes in Step S117), the security enhancement unit 106 increases the parameter N so that the decryption time T satisfies T$\geq$SLI, and newly generates a parameter set PS=(N, p, q, df, dg, and d) using the increased parameter N (Step S118).

If T$\geq$SLI (No in Step S117), after performing the process in Step S118, the security enhancement unit 106 judges whether the parameter N is a prime number or not (Step S119).

When the parameter N is not a prime number (No in Step S119), the security enhancement unit 106 increases the parameter N so that the increased parameter N becomes a prime number, and generates a new parameter set PS=(N, p, q, df, dg, and d) using such increased parameter N (Step S120).

When the parameter N is a prime number (Yes in Step S119), the security enhancement unit 106 outputs the parameter set PS to the output unit 107, after performing the process (Step S120) for increasing the parameter N to a prime number (Step S121).

The output unit 107 receives the parameter set PS from the security enhancement unit 106, outputs such parameter set PS to the outside, and terminates the processing (Step S122).

If GL>SL (No in Step S113), the second parameter modification unit 109 receives the security level information SLI from the input unit 101, as well as the parameter set PS from the security judgment unit 105, and generates a parameter candidate set DS (Step S123).

The second parameter modification unit 109 compares the parameter dg in the parameter set PS with the maximum value M of all the elements in the parameter candidate set DS (Step S124).

If dg<M (Yes in Step S124), the second parameter modification unit 109 changes the parameter dg to a value that is larger than the maximum element included in the parameter candidate set DS, and generates a new parameter set PS=(N, p, q, df, dg, and d) using the changed parameter dg, and outputs the generated parameter set PS to the security judgment unit 105 (Step S125). Subsequently, the processing is returned to Step S112.

If dg$\geq$M (No in Step S124), the second parameter modification unit 109 outputs the parameter set PS to the first parameter modification unit 108 (Step S126). Subsequently, the processing is returned to Step S108.

<Verification of Operation of Parameter Generation Apparatus 1>

The following describes the overall operation of the parameter generation apparatus 1 according to the first embodiment.

First, the first parameter generation unit 102 chooses the parameter N that is large enough to meet the security level information SLI (Step S102).

Subsequently, the second parameter generation unit 103 generates a parameter candidate set DS as a set of parameter candidates with which it is possible to achieve the security level indicated by the security level information SLI (Step S105). Furthermore, the second parameter generation unit 103 chooses, from among the elements in the parameter candidate set DS, parameters df, dg, and d that achieve the security level indicated by the security level information SLI (Step S109).

Note that when there is not a sufficient number of elements in the parameter candidate set DS, the first parameter modification unit 108 increases the parameter N (Step S108). In general, as described above, since the number of elements in the parameter candidate set DS becomes larger with the increase in the value of the parameter N, it is possible to choose parameters df, dg, and d without fail.

Furthermore, by the third parameter generation unit 104 choosing the parameter q that satisfies the conditional expression ED for generating parameters that do not cause any decryption errors, the values of the parameter set PS=(N, p, q, df, dg, and d) are determined (Step S111).

If a value that satisfies the conditional expression ED is chosen here as the value of the parameter q, such chosen value generally becomes larger than that of a parameter q in the NTRU cryptosystem described in Documents 2 and 3. In other words, since the value of the lattice constant GL becomes small, there is the possibility of a lowered security level (shorter decryption time) against decryption using the LLL algorithm, compared with the NTRU cryptosystem described in Documents 2 and 3 that uses parameters df, dg, and d of an equivalent order of magnitude.

In response to this, based on the pre-stored lattice constant GL, the security judgment unit 105 judges whether it is possible to evaluate decryption time needed to perform decryption in an NTRU cryptosystem having the generated parameter set PS, by using the decryption time evaluation formula EF that is associated with such pre-stored lattice constant GL (Step S113). If it is possible, the security enhancement unit 106 increases the parameter N so that the security level indicated by the security level information SLI can be achieved (Step S118).

Note that when it is judged that decryption time in the NTRU cryptosystem cannot be evaluated by the decryption time evaluation formula that is based on the pre-stored lattice constant GL, the second parameter modification unit 109 tries to make it possible for the decryption time to be evaluated by the decryption time evaluation formula EF, by increasing the value of the parameter dg (Step S125) so as to increase the value of the lattice constant for the NTRU cryptosystem having such parameter. If the decryption time evaluation formula EF still cannot be used to evaluate the decryption time, the first parameter modification unit 108 increases the parameter N (Step S108), so as to generate the parameters df, dg, d, and q once again (the subsequent steps from Step S109).

Here, if the parameter N takes a large value, the parameter candidate set DS comes to have a larger number of elements in general. Thus, when the parameters df, dg, and d are chosen again in Step S109, only the parameter dg is required to take a larger value, with the values of the other parameters df and d remaining unchanged. Since the value of the parameter dg does not affect the conditional expression for decryption error occurrence, it becomes possible to evaluate the decryption time using the decryption time evaluation formula EF by increasing the value of the lattice constant GL, with decryption error-free communications being ensured.

As described above, the present invention makes it possible to generate a parameter set PS for an NTRU cryptosystem having the following features, by repeating processing for only a limited number of times: a parameter set PS that achieves the security level indicated by input security level information SLI that ensures security against decryption by means of an exhaustive search and decryption using the LLL algorithm; and a parameter set PS that does not cause any decryption errors.

<Effects Achieved by First Embodiment>

It is not possible for the existing techniques to generate NTRU parameters that are secure against decryption by third parties and that do not cause any decryption errors, since conditions for generating such parameters are not known. This makes it impossible for an encryption apparatus and a decryption apparatus to carry out encrypted communications in a secure and reliable manner.

However, as described above, since the parameter generation apparatus according to the present invention determines the parameter q that does not cause any decryption errors in theory, and determines the parameter N that achieves an input security level, it becomes possible to generate NTRU parameters that can ensure security and that do not cause any decryption errors in theory.

Second Embodiment

The following describes the parameter conversion apparatus 2 according to the second embodiment of the present invention, focusing mainly on its difference from the parameter generation apparatus 1 according to the first embodiment.

<Overview of Parameter Conversion Apparatus 2>

Figure 6:
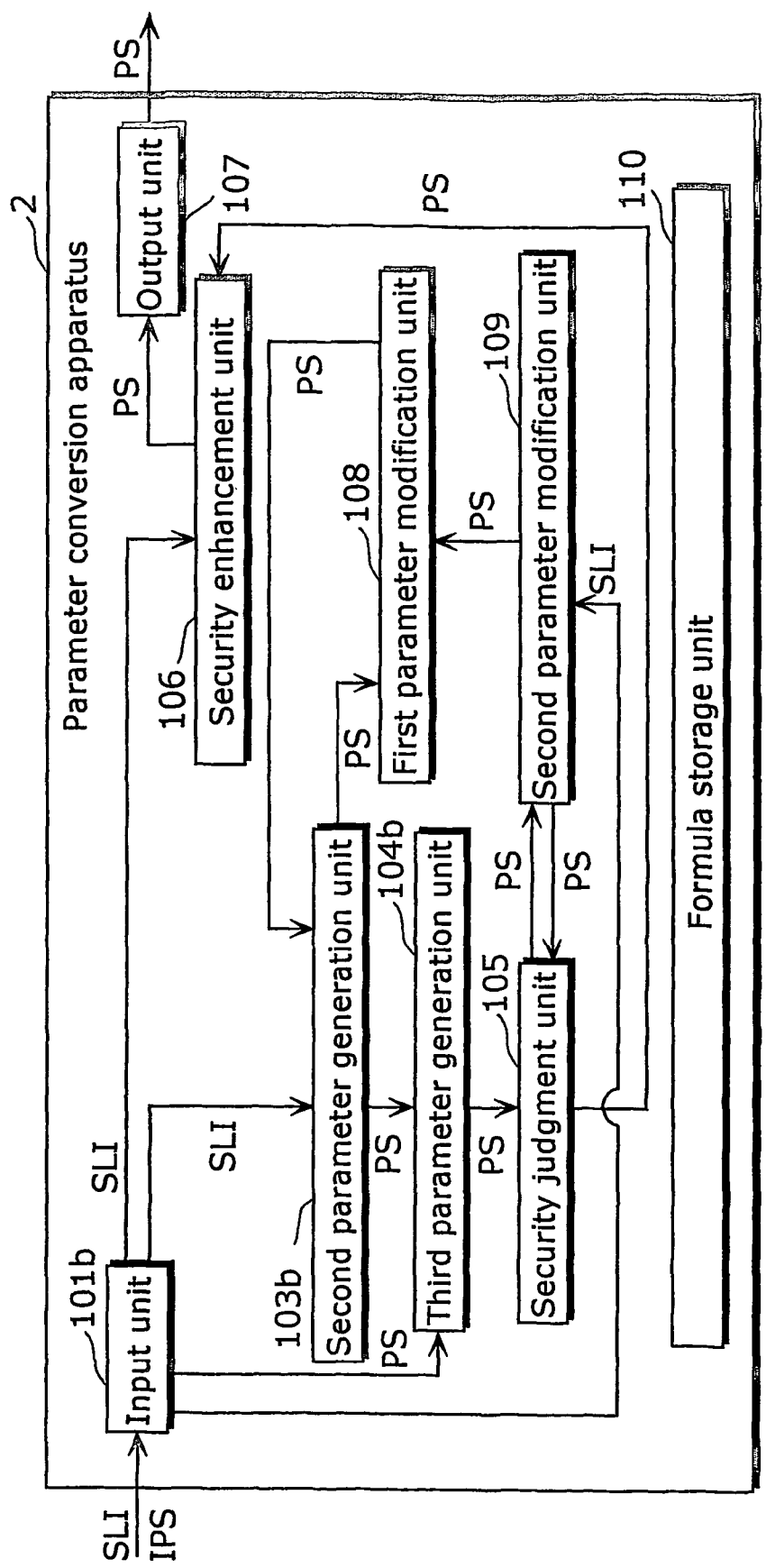
FIG. 6 is a diagram showing a configuration of a parameter conversion apparatus 2 according to a second embodiment of the present invention.

Referring to FIG. 6, a description is first given of an overview of the present embodiment.

This parameter conversion apparatus 2 is a parameter conversion apparatus as a variation of the parameter generation apparatus 1 according to the first embodiment. Its difference from the parameter generation apparatus 1 is that the parameter conversion apparatus 2, when receiving a parameter set IPS for an NTRU cryptosystem as an input, outputs such parameter set IPS after converting it into a parameter set PS for the NTRU cryptosystem that (i) achieves the security level indicated by input security level information SLI to ensure safety from decryption by means of an exhaustive search and decryption using the LLL algorithm and (ii) does not cause any decryption errors.

Note that as in the case of the parameter generation apparatus 1 according to the first embodiment, the parameter conversion apparatus 2 is provided in advance with a lattice constant GL for an NTRU cryptosystem having certain parameters, a decryption time evaluation formula EF for the NTRU cryptosystem having the above lattice constant GL, and a conditional expression ED for generating parameters that do not cause any decryption errors.

<Configuration of Parameter Conversion Apparatus 2>

As FIG. 6 shows, the parameter conversion apparatus 2 is comprised of an input unit 101b, a second parameter generation unit 103b, a third parameter generation unit 104b, the security judgment unit 105, the security enhancement unit 106, the output unit 107, the first parameter modification unit 108, the second parameter modification unit 109, and the formula storage unit 110.

The parameter conversion apparatus 2 is different from the parameter generation apparatus 1 according to the first embodiment in the following points: the input unit 101b is different; there is no first parameter generation unit; input/output of the second parameter generation unit 103b is different; and input/output of the third parameter generation unit 104b is different.

The following describes the parameter conversion apparatus 2, focusing on its difference from the parameter generation apparatus 1.

(1) Input Unit 101b

The input unit 101b receives, from outside, security level information SLI and a parameter set IPS for the NTRU cryptosystem, and outputs such security level information SLI to the second parameter generation unit 103b and the second parameter modification unit 109. Furthermore, the input unit 101b outputs the parameter set IPS to the third parameter generation unit 104b, as a parameter set PS.

(2) Second Parameter Generation Unit 103b

The second parameter generation unit 103b receives the parameter set PS from the first parameter modification unit 108, and receives the security level information SLI from the input unit 101b. Then, the second parameter generation unit 103b generates a parameter candidate set DS in the same manner as that of the second parameter generation unit 103. The second parameter generation unit 103b then judges whether or not there is a sufficient number of elements in the parameter candidate set DS to choose parameters df, dg, and d (e.g. whether the number of elements is 3 or more) in the same manner as that of the second parameter generation unit 103. When there is not a sufficient number of elements, the second parameter generation unit 103b outputs the parameter set PS to the first parameter modification unit 108. When there is a sufficient number of elements, on the other hand, the second parameter generation unit 103b chooses the parameters df, dg, and d from the parameter candidate set DS. Then, using the chosen parameters df, dg, and d, the parameter generation unit 103b newly generates a parameter set PS=(N, p, q, df, dg, and d), and outputs it to the third parameter generation unit 104b.

(3) Third Parameter Generation Unit 104b

The third parameter generation unit 104b receives the parameter set PS from the input unit 101b or the second parameter generation unit 103b, and reads, from the formula storage unit 110, the conditional expression ED for generating parameters that do not cause any decryption errors. Then, the third parameter generation unit 104b chooses, as a parameter q, the smallest parameter q that satisfies the conditional expression ED in relation to the parameters df, dg, and d included in the parameter set PS and that serves as a power of 2, in the same manner as that of the third parameter generation unit 104. Finally, the third parameter generation unit 104b newly generates a parameter set PS=(N, p, q, df, dg, and d) using the chosen parameter q, and outputs the generated parameter set PS to the security judgment unit 105.

<Operation of Parameter Conversion Apparatus 2>

Figure 7:
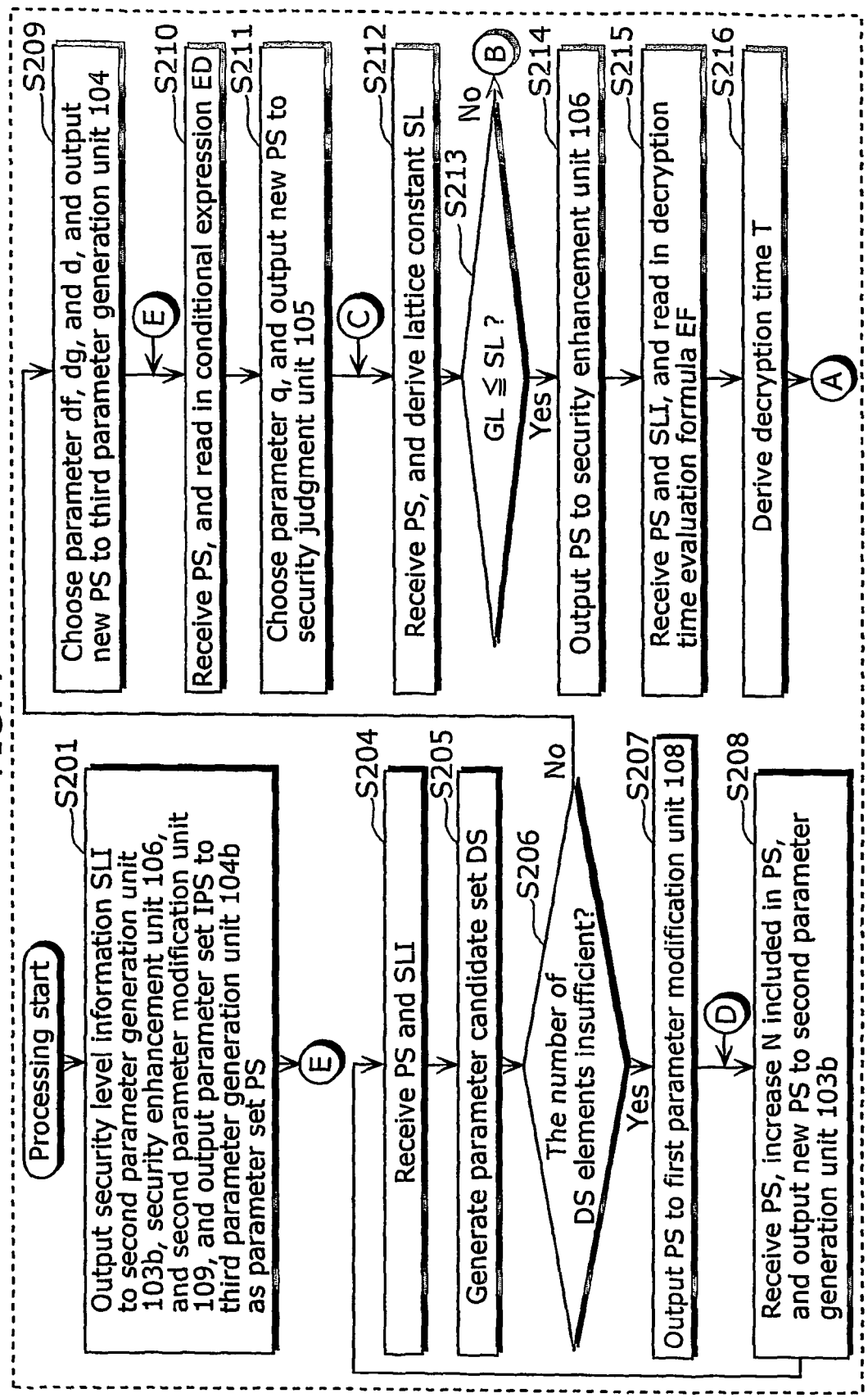
FIG. 7 is a flowchart showing the former part of processing performed by the parameter conversion apparatus 2 according to the second embodiment of the present invention.
Figure 8:
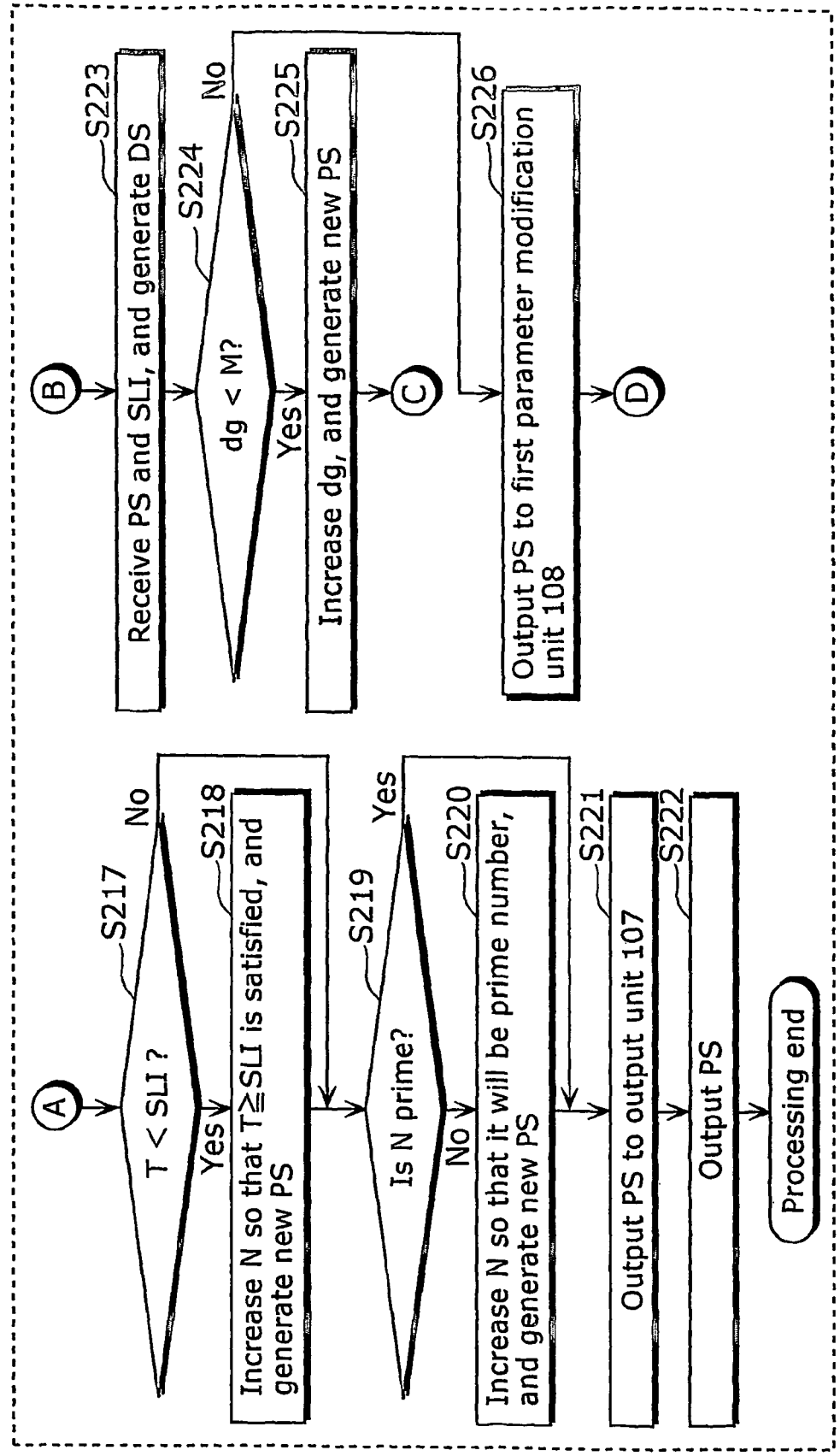
FIG. 8 is a flowchart showing the latter part of the processing performed by the parameter conversion apparatus 2 according to the second embodiment of the present invention.

Referring to the flowcharts shown in FIGS. 7 and 8, the operation of the parameter conversion apparatus 2 with the above configuration is described.

The parameter conversion apparatus 2 is provided, in advance, with a lattice constant GL for an NTRU cryptosystem having certain parameters, a decryption time evaluation formula EF for the NTRU cryptosystem having the above lattice constant GL, and a conditional expression ED for generating parameters that do not cause any decryption errors, as in the case of the parameter generation apparatus 1 according to the first embodiment. The parameter conversion apparatus 2 performs the following operation upon receipt of security level information SLI and a parameter set IPS from the outside.

The input unit 101b receives the security level information SLI and the parameter set IPS for the NTRU cryptosystem from outside, and outputs such security level information SLI to the second parameter generation unit 103b, the security enhancement unit 106, and the second parameter modification unit 109. Moreover, the input unit 101b outputs the parameter set IPS to the third parameter generation unit 104b, as the parameter set PS, and then shifts the processing to Step S210 (Step S201).

The second parameter generation unit 103b receives the parameter set PS from the first parameter modification unit 108, and receives the security level information SLI from the input unit 101b (Step S204).

The second parameter generation unit 103b generates a parameter candidate set DS (Step S205).

The second parameter generation unit 103b judges whether or not there is a sufficient number of elements in the parameter candidate set DS to choose parameters df, dg, and d (Step S206).

When the parameter candidate set DS includes a sufficient number of elements (Yes in Step S206), the second parameter generation unit 103b outputs the parameter set PS to the first parameter modification unit 108 (Step S207).

The first parameter modification unit 108 receives the parameter set PS from the second parameter generation unit 103b or the second parameter modification unit 109, increases the parameter N in such parameter set PS, generates a new parameter set PS=(N, p, q, df, dg, and d) using the increased parameter N, and outputs the generated parameter set PS to the second parameter generation unit 103b. The processing is then returned to Step S204 (Step S208).

When there is not a sufficient number of DS elements (No in Step S206), the second parameter generation unit 103b chooses the parameters df, dg, and d from the parameter candidate set DS. Then, using the chosen parameters df, dg, and d, the parameter generation unit 103b newly generates a parameter set PS=(N, p, q, df, dg, and d), and outputs it to the third parameter generation unit 104b (Step S209).

The third parameter generation unit 104b receives the parameter set PS from the input unit 101b, and reads, from the formula storage unit 110, the conditional expression ED for generating parameters that do not cause any decryption errors (Step S210).

Then, the third parameter generation unit 104b chooses, as a parameter q, the smallest parameter q that satisfies the conditional expression ED in relation to the parameters df, dg, and d in the parameter set PS and that serves as a power of 2. Finally, the third parameter generation unit 104b newly generates a parameter set PS=(N, p, q, df, dg, and d) using the chosen parameter q, and outputs the generated parameter set PS to the security judgment unit 105 (Step S211).

The security judgment unit 105 receives the parameter set PS from the third parameter generation unit 104b or the second parameter modification unit 109, and derives a lattice constant SL for an NTRU cryptosystem having the parameters N, p, q, df, and dg in the parameter set PS (Step S212).

The security judgment unit 105 reads the lattice constant GL from the formula storage unit 110, and judges whether or not $GL \leq SL$ is satisfied (Step S213).

If $GL \leq SL$ (Yes in Step S213), the security judgment unit 105 outputs the parameter set PS to the security enhancement unit 106 (Step S214).

The security enhancement unit 106 receives the parameter set PS from the security judgment unit 105, as well as the security level information SLI from the input unit 101b, and reads the decryption time evaluation formula EF from the formula storage unit 110 (Step S215).

Furthermore, the security enhancement unit 106 derives decryption time T needed to perform decryption in the NTRU cryptosystem from the parameter N in the parameter set PS and the decryption time evaluation formula EF (Step S216).

The security enhancement unit 106 judges whether or not the above-derived decryption time T satisfies T<SLI (Step S217).

If T<SLI (Yes in Step S217), the security enhancement unit 106 increases the parameter N so that the decryption time T satisfies T≧SLI, and newly generates a parameter set PS=(N, p, q, df, dg, and d) using the increased parameter N (Step S218).

If T≧SLI (No in Step S217), after performing the process in Step S218, the security enhancement unit 106 judges whether the parameter N is a prime number or not (Step S219).

When the parameter N is not a prime number (No in Step S219), the security enhancement unit 106 increases the parameter N so that the increased parameter N becomes a prime number, and generates a new parameter set PS=(N, p, q, df, dg, and d) using such increased parameter N (Step S220).

When the parameter N is a prime number (Yes in Step S219), the security enhancement unit 106 outputs the parameter set PS to the output unit 107, after performing the process (Step S220) for making the parameter N a prime number (Step S221).

The output unit 107 receives the parameter set PS from the security enhancement unit 106, outputs such parameter set PS to the outside, and terminates the processing (Step S222).

If GL>SL (No in Step S213), the second parameter modification unit 109 receives the security level information SLI from the input unit 101b, as well as the parameter set PS from the security judgment unit 105, and generates a parameter candidate set DS (Step S223).

The second parameter modification unit 109 compares the parameter dg in the parameter set PS with the maximum value M of all the elements in the parameter candidate set DS (Step S224).

If dg<M (Yes in Step S224), the second parameter modification unit 109 changes the parameter dg to a value that is larger than the maximum element included in the parameter candidate set DS, and generates a new parameter set PS=(N, p, q, df, dg, and d) using the changed parameter dg, and outputs the generated parameter set PS to the security judgment unit 105 (Step S225). Subsequently, the processing is returned to Step S212.

If dg≧M (No in Step S224), the second parameter modification unit 109 outputs the parameter set PS to the first parameter modification unit 108 (Step S226). Subsequently, the processing is returned to Step S208.

<Verification of Operation of Parameter Conversion Apparatus 2>

The following describes the overall operation of the parameter conversion apparatus 2 according to the second embodiment.

First, the input unit 101b outputs the input parameter set IPS for an NTRU cryptosystem to the third parameter generation unit 104b, as a parameter set PS (S201).

Then, as in the case of the first embodiment, the second parameter generation unit 103b generates a parameter candidate set DS as a set of parameter candidates by which it is possible to achieve the security level indicated by the security level information SLI for ensuring security against decryption in the NTRU cryptosystem by means of an exhaustive search (Step S205).

Furthermore, by the third parameter generation unit 104b choosing the parameter q that satisfies the conditional expression ED for generating parameters that do not cause any decryption errors, the values of the parameter set PS=(N, p, q, df, dg, and d) are determined (Step S211).

Here, as in the case of the first embodiment, if a value that satisfies the conditional expression ED is chosen as the value of the parameter q, there is the possibility of lowered security level (shorter decryption time) against decryption using the LLL algorithm. In response to this, based on the pre-stored lattice constant GL, the security judgment unit 105 judges whether it is possible to evaluate decryption time needed to perform decryption in the NTRU cryptosystem having the generated parameter set PS, by using the decryption time evaluation formula EF that is based on such pre-stored lattice constant GL (Step S213). If it is possible, the security enhancement unit 106 increases the parameter N so that the security level indicated by the security level information SLI can be achieved (Step S218).

Note that when that is not possible, the second parameter modification unit 109 tries to make it possible for the decryption time to be evaluated by the decryption time evaluation formula EF by increasing the value of the parameter dg (Step S225) so as to increase the value of the lattice constant for the NTRU cryptosystem having such parameter. If the decryption time evaluation formula EF still cannot be used to evaluate the decryption time, the first parameter modification unit 108 increases the parameter N (Step S208), so as to generate the parameters df, dg, d, and q once again (the subsequent steps from Step S209).

Here, if the parameter N takes a large value, the parameter candidate set DS comes to have a larger number of elements in general. Thus, when the parameters df, dg, and d are chosen once again (Step S209), only the parameter dg is required to take a larger value, with the values of the other parameters df and d remaining unchanged. Since the value of the parameter dg does not affect the conditional expression for decryption error occurrence, it becomes possible to evaluate the decryption time using the decryption time evaluation formula EF by increasing the value of the lattice constant GL, with decryption error-free communications being ensured.

As described above, the present invention makes it possible to convert the input parameter IPS for an NTRU cryptosystem into a parameter set PS for the NTRU cryptosystem that has the following features, by repeating processing for only a limited number of times: a parameter set PS that achieves the security level indicated by input security level information SLI that ensures security against decryption by means of an exhaustive search and decryption using the LLL algorithm; and a parameter set PS that does not cause any decryption errors.

<Effect Achieved by Second Embodiment>

It is not possible for the existing techniques to generate NTRU parameters that are secure against decryption by third parties and that do not cause any decryption errors, since conditions for generating such parameters are not known. This makes it impossible for an encryption apparatus and a decryption apparatus to carry out encrypted communications in a secure and reliable manner.

However, as described above, since the parameter conversion apparatus according to the present invention determines the parameter q for the input NTRU parameters so that no decryption error occurs in theory, and determines the parameter N that achieves an input security level, it becomes possible to generate NTRU parameters that can ensure security and that do not cause any decryption errors in theory.

Third Embodiment

The following describes the encryption system 3 according to the third embodiment of the present invention.

<Configuration of Encryption System 3>

Figure 11:
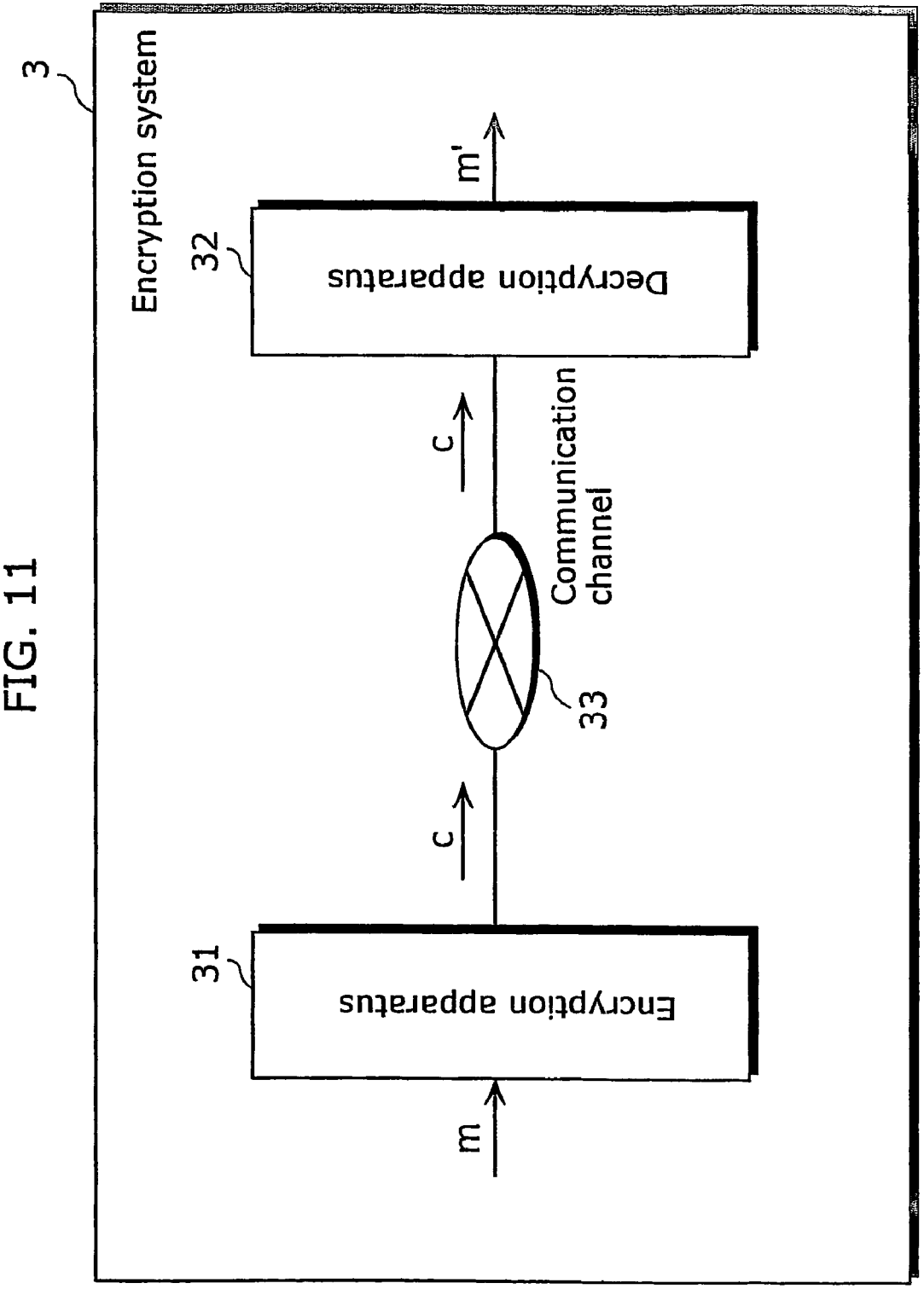
FIG. 11 is a diagram showing a configuration of an encryption system 3 according to a third embodiment of the present invention.

As FIG. 11 shows, this encryption system 3, which is formed of an encryption apparatus 31, a decryption apparatus 32, and a communication channel 33, is a system in which an encrypted communication is carried out by use of NTRU parameters, generated by either the parameter generation apparatus 1 according to the first embodiment or the parameter conversion apparatus 2 according to the second embodiment, that are secure against decryption by third parties and that do not cause any decryption errors.

<Configuration of Encryption Apparatus 31>

Figure 12:
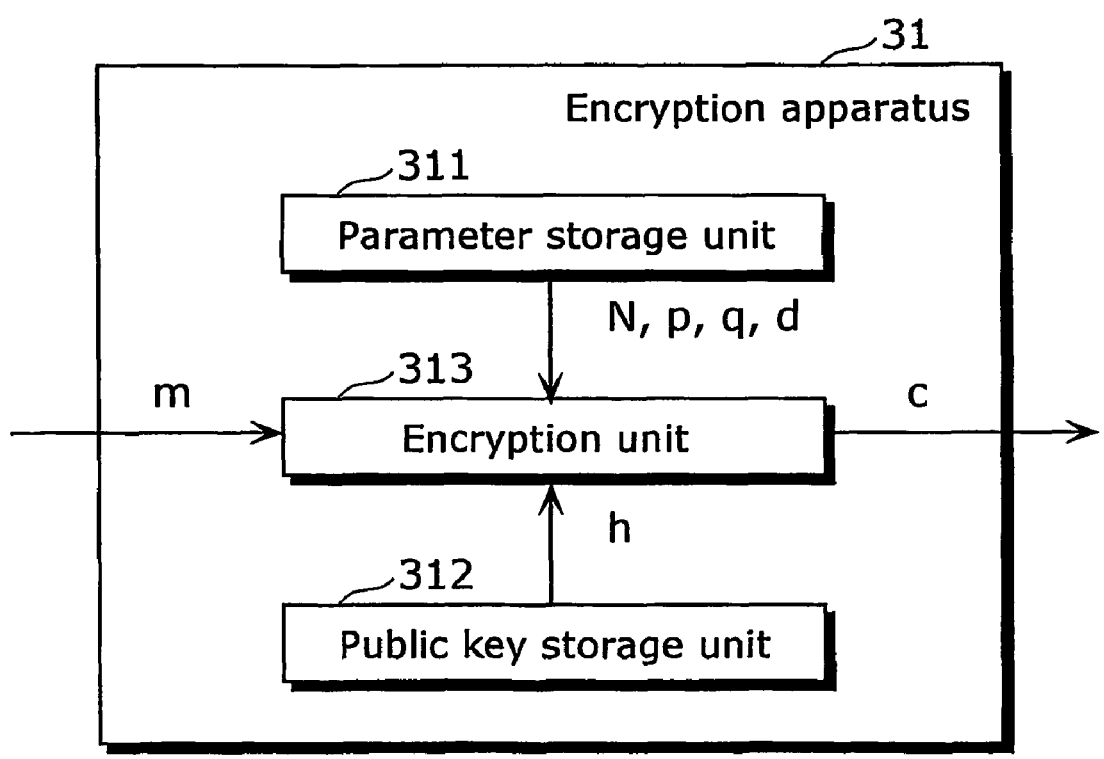
FIG. 12 is a diagram showing a configuration of an encryption apparatus 31 according to the third embodiment of the present invention.

Referring to FIG. 12, the encryption apparatus 31, which is an apparatus for generating an encrypted text polynomial c by encrypting a plaintext polynomial m, is comprised of a parameter storage unit 311, a public key storage unit 312, and an encryption unit 313.

(1) Parameter Storage Unit 311

The parameter storage unit 311 stores, in advance, NTRU parameters, i.e., the parameter N, parameter p, parameter q, parameter df, parameter dg, and parameter d that are generated by the parameter generation apparatus 1 according to the first embodiment or by the parameter conversion apparatus 2 according to the second embodiment (2) Public Key Storage Unit 312

The public key storage unit 312 stores a public key polynomial h of the decryption apparatus 32 that it has obtained in advance.

This public key polynomial h is a polynomial represented by a polynomial of degree (N−1) or lower with respect to the parameter N.

(3) Encryption unit 313

The encryption unit 313 receives the parameter N, parameter p, parameter q, and parameter d from the parameter storage unit 311, receives the public key polynomial h from the public key storage unit 312, and receives, from outside, the plaintext polynomial m that is represented by a polynomial of degree (N−1) or lower with respect to the parameter N.

Using the parameter N and the parameter d, the encryption unit 313 randomly chooses a random number polynomial r of degree (N−1) whose d coefficients equal to "1", d coefficients equal to "−1", and the other coefficients equal to "0".

The encryption unit 313 performs encryption of an NTRU cryptosystem on the plaintext polynomial m by use of the random number polynomial r, public key polynomial h, parameter N, parameter p, and parameter q, so as to determine the encrypted text polynomial c.

This method for determining the encrypted text polynomial c is described in detail in Document 2, and therefore no description is given here. The encryption unit 313 transmits the generated encrypted text polynomial c to the decryption apparatus 32 via the communication channel 33.

<Configuration of Decryption Apparatus 32>

Figure 13:
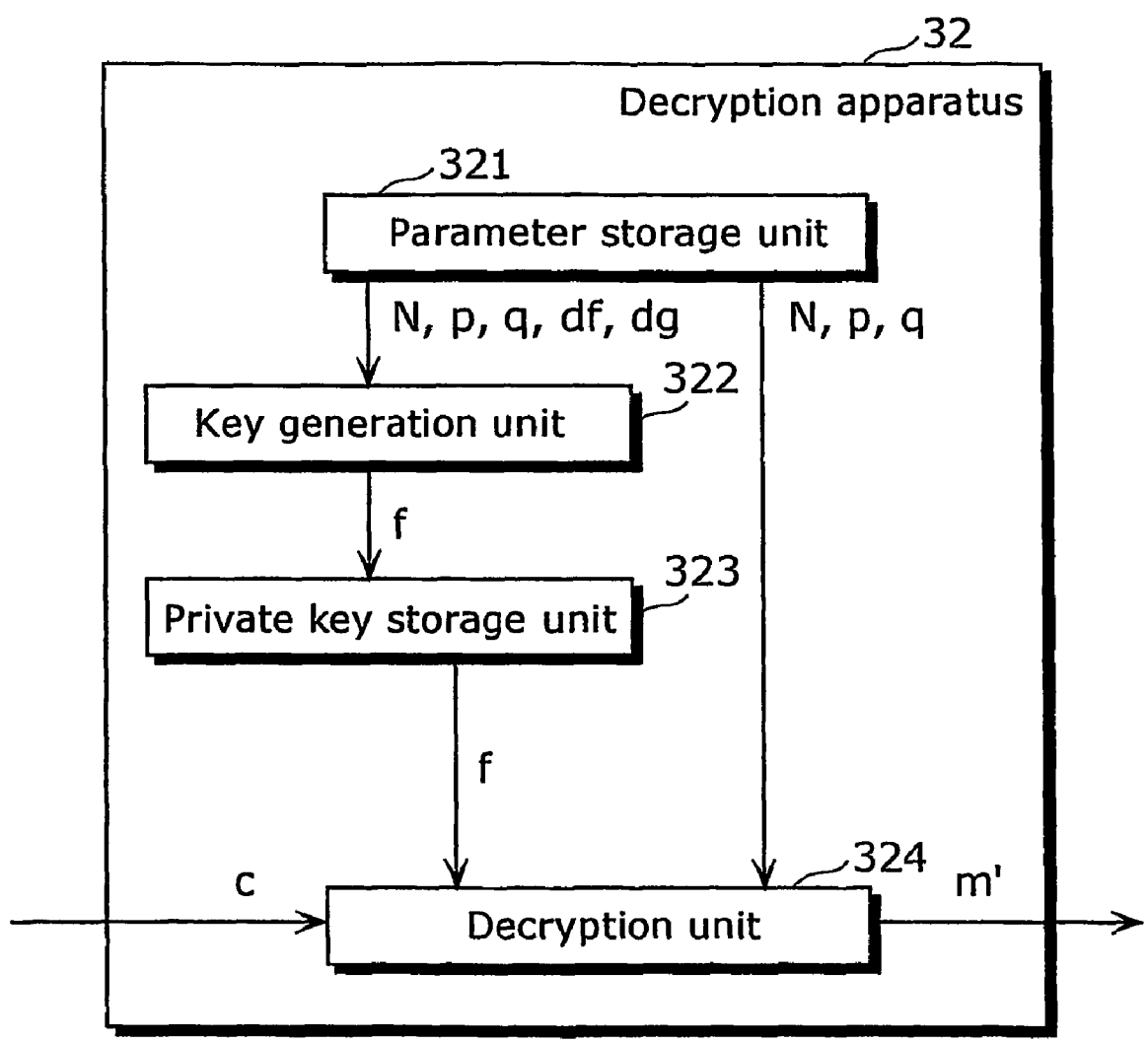
FIG. 13 is a diagram showing a configuration of a decryption apparatus 32 according to the third embodiment of the present invention.

Referring to FIG. 13, the decryption apparatus 32, which is an apparatus for computing a decrypted text polynomial m' by decrypting the encrypted text polynomial c, is comprised of a parameter storage unit 321, a key generation unit 322, a private key storage unit 323, and a decryption unit 324.

(1) Parameter Storage Unit 321

The parameter storage unit 321 stores the same NTRU parameters as those stored in the parameter storage unit 311 of the encryption apparatus 31.

More specifically, the parameter storage unit 321 stores, in advance, the parameter N, parameter p, parameter q, parameter df, parameter dg, and parameter d that are the same as those stored in the parameter storage unit 311.

(2) Key Generation Unit 322

The key generation unit 322 receives the parameter N, parameter p, parameter q, parameter df, and parameter dg from the parameter storage unit 321, and generates a private key polynomial f and a public key polynomial h that are each represented by a polynomial of degree (N−1) or lower, by use of the parameter N, parameter p, parameter q, parameter df, and parameter dg. Note that the method for generating this private key polynomial f and public key polynomial h is described in detail in Document 2, and therefore no description is given here.

Then, the key generation unit 322 enables the encryption apparatus 31 to obtain the public key polynomial h by disclosing it. Moreover, the public key generation unit 322 stores the private key polynomial f into the private key storage unit 323.

(3) Private Key Storage Unit 323

The private key storage unit 323 stores, in advance, the private key polynomial f of the decryption apparatus 32.

This private key polynomial f is represented by a polynomial of degree (N−1) or lower, with respect to the parameter N.

(4) Decryption Unit 324

The decryption unit 324 receives the parameter N, parameter p, and parameter q from the parameter storage unit 321, receives the private key polynomial f from the private key storage unit 323, and receives the encrypted text polynomial c from the encryption apparatus 31 via the communication channel 33.

The decryption unit 324 performs decryption of the NTRU cryptosystem on the encrypted text polynomial c by use of the private key polynomial f, parameter N, parameter p, and parameter q, so as to determine the decrypted text polynomial m'. The method for performing decryption of the NTRU cryptosystem is described in detail in Document 2, and therefore no description is given here.

The decryption unit 324 outputs such generated decrypted text polynomial m' to the outside.

<Operation of Encryption System 3>

Figure 14:
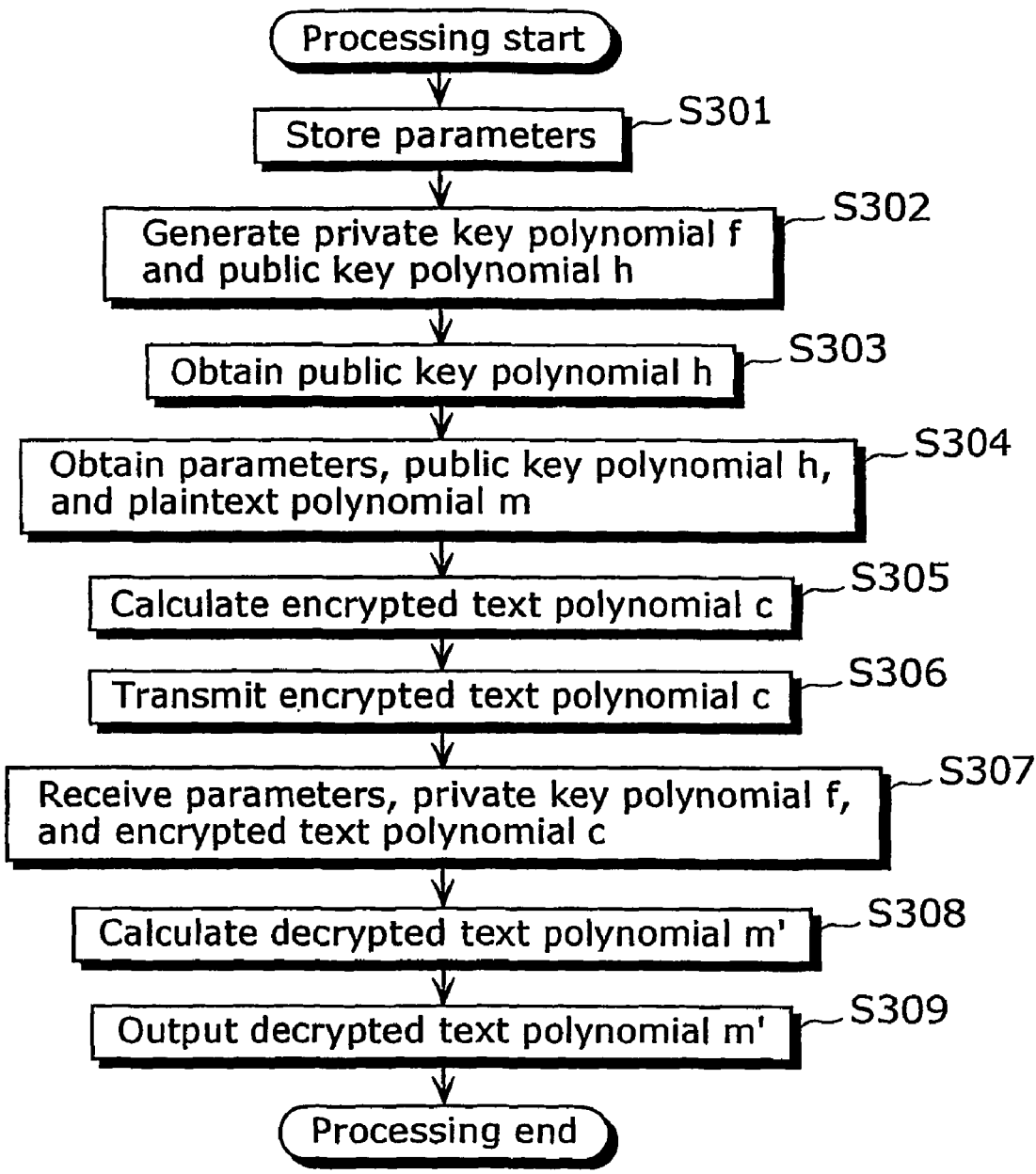
FIG. 14 is a flowchart showing an operation of the encryption system 3 according to the third embodiment of the present invention.

The following describes the operation of the encryption system 3 with the above configuration. FIG. 14 is a flowchart showing the operation of the encryption system 3.

In the encryption system 3, out of the NTRU parameters that are generated by the parameter generation apparatus 1 of the first embodiment or the parameter conversion apparatus 2 of the second embodiment, at last the parameter N, parameter p, parameter q and parameter d are stored in the parameter storage unit 311 of the encryption apparatus 31, and at least the parameter N, parameter p, parameter q, parameter df, and parameter dg are stored in the parameter storage unit 321 of the decryption apparatus 32 (Step S301).

The key generation unit 322 of the decryption apparatus 32 receives the parameter N, parameter p, parameter q, parameter df, and parameter dg from the parameter storage unit 321. Then, the key generation unit 322 generates the private key polynomial f and the public key polynomial h, and discloses the public key polynomial h so as to enable the encryption unit 31 to obtain it. Furthermore, the key generation unit 322 stores the private key polynomial f into the private key storage unit 323 (Step S302).

The public key storage unit 312 of the encryption apparatus 31 obtains the public key polynomial h of the decryption apparatus 32 and stores it (Step S303).

The encryption unit 313 of the encryption apparatus 31 receives the parameter N, parameter p, parameter q, and parameter d from the parameter storage unit 311, receives the public key polynomial h from the public key storage unit 312, and receives, from outside, the plaintext polynomial m that is represented by a polynomial of degree (N−1) or lower with respect to the parameter N (Step S304).

Using the parameter N and the parameter d, the encryption unit 313 of the encryption apparatus 31 randomly chooses a random number polynomial r of degree (N−1) whose d coefficients equal to "1", d coefficients equal to "−1", and the other coefficients equal to "0". The encryption unit 313 performs encryption of an NTRU cryptosystem on the plaintext polynomial m by use of the random number polynomial r, public key polynomial h, parameter N, parameter p, and parameter q, so as to determine the encrypted text polynomial c (Step S305).

The encryption unit 313 of the encryption apparatus 31 transmits the encrypted text polynomial c to the decryption apparatus 32 via the communication channel 33 (Step S306).

The decryption unit 324 of the decryption apparatus 32 receives the parameter N, parameter p, and parameter q from the parameter storage unit 321, receives the private key polynomial f from the private key storage unit 323, and receives the encrypted text polynomial c from the encryption apparatus 31 via the communication channel 33 (Step S307).

The decryption unit 324 of the decryption apparatus 32 performs decryption of the NTRU cryptosystem on the encrypted text polynomial c by use of the private key polynomial f, parameter N, parameter p, and parameter q, so as to determine the decrypted text polynomial m' (Step S308).

Then, the decryption unit 324 of the decryption apparatus 32 outputs such decrypted text polynomial m' to the outside, and terminates the processing (Step S309).

<Verification of Operation of Encryption System 3>

First, the decryption apparatus 32 generates the private key polynomial f and public key polynomial h by use of the NTRU parameters that are generated by the parameter generation apparatus 1 of the first embodiment or the parameter conversion apparatus 2 of the second embodiment (Step S302).

Then, the encryption apparatus 31 encrypts the plaintext polynomial m by use of the NTRU parameters that are generated by the parameter generation apparatus 1 of the first embodiment or the parameter conversion apparatus 2 of the second embodiment (Step S305).

As described above, by use of the parameters that are generated by the parameter generation apparatus 1 of the first embodiment or the parameter conversion apparatus 2 of the second embodiment, the generation of the private key polynomial f and the public key polynomial h, as well as encryption is performed. Therefore, it can be said that an encrypted communication according to the present embodiment is secure against decryption by third parties, and that no decryption error occurs in such encrypted communication.

<Effects Achieved by Third Embodiment>

It is not possible for the existing techniques to generate NTRU parameters that are secure against decryption by third parties and that do not cause any decryption errors, since conditions for generating such parameters are not known. This makes it impossible for an encryption apparatus and a decryption apparatus to carry out encrypted communications in a secure and reliable manner.

However, as described above, in the encryption system according to the present invention, since the generation of the private key polynomial f and the public key polynomial h as well as encryption is performed by use of the NTRU parameters that are generated by the parameter generation apparatus 1 of the first embodiment or the parameter conversion apparatus 2 of the second embodiment, it becomes possible for an encryption apparatus and a decryption apparatus to carry out an encrypted communication in a secure and reliable manner.

Fourth Embodiment

The following describes an encryption system 4 according to the fourth embodiment of the present invention.

<Configuration of Encryption System 4>

Figure 15:
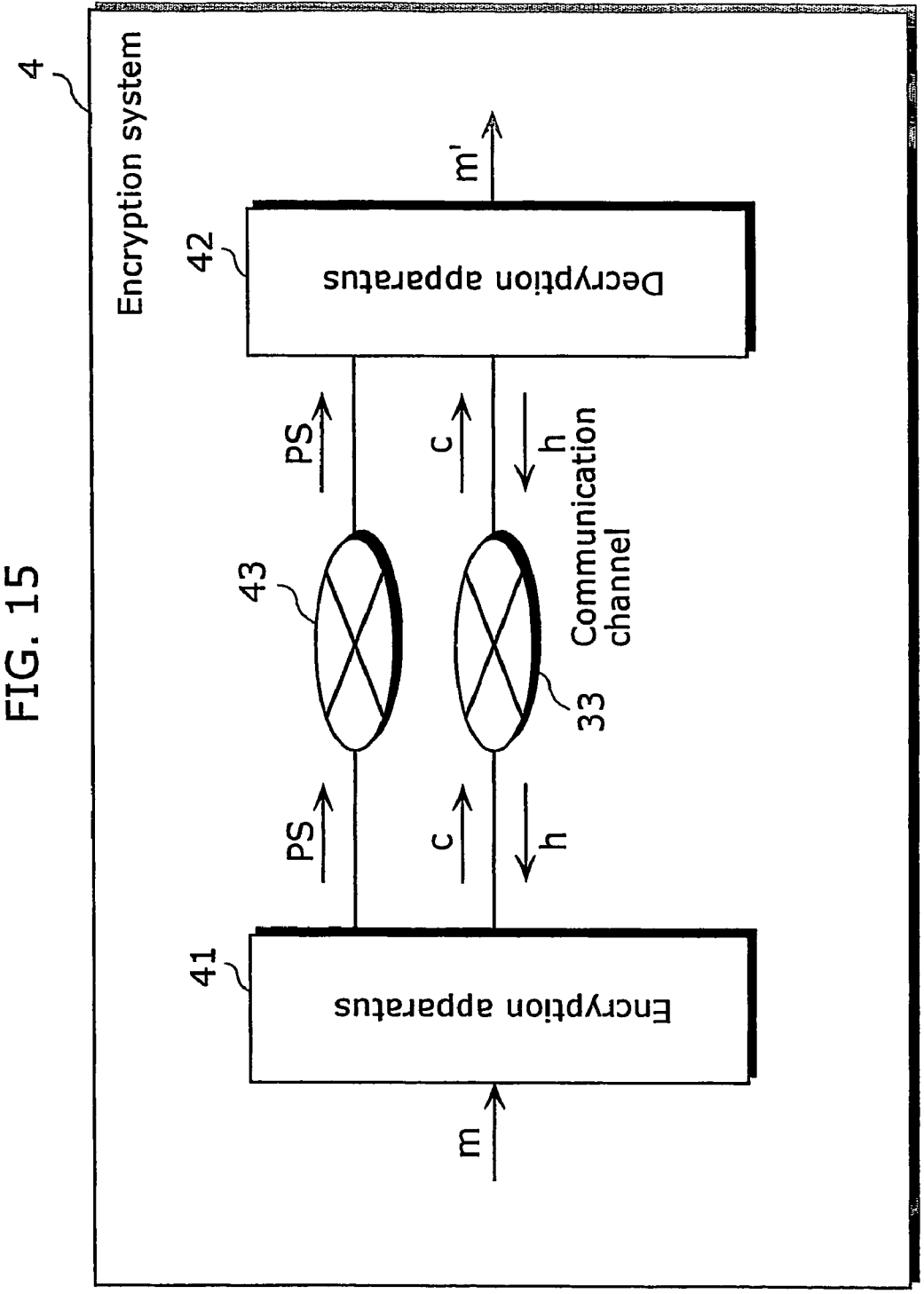
FIG. 15 is a diagram showing a configuration of an encryption system 4 according to a fourth embodiment of the present invention.

As FIG. 15 shows, the encryption system 4 is formed of an encryption apparatus 41, a decryption apparatus 42, and communication channels 33 and 43.

<Configuration of Encryption Apparatus 41>

Figure 16:
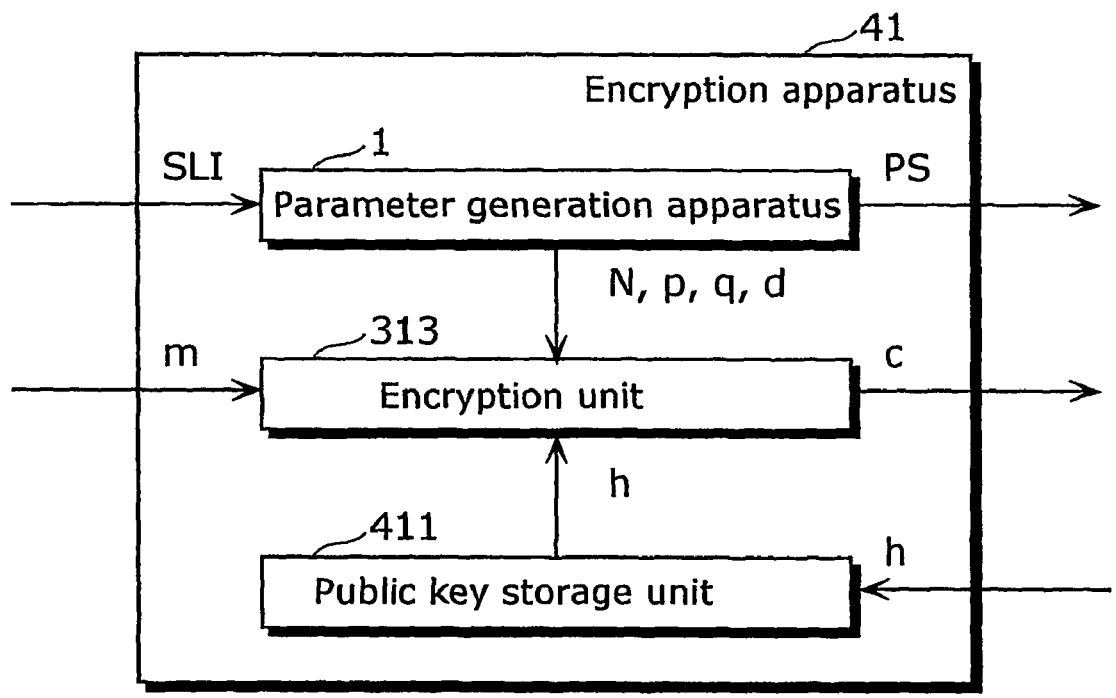
FIG. 16 is a diagram showing a configuration of an encryption apparatus 41 according to the fourth embodiment of the present invention.

Referring to FIG. 16, the encryption apparatus 41, which is an apparatus for generating an encrypted text polynomial c by encrypting a plaintext polynomial m, is comprised of a parameter generation apparatus 1, an encryption unit 313, and a public key storage unit 411.

(1) Parameter Generation Apparatus 1 and Encryption Unit 313

The configuration of the parameter generation apparatus 1 is the same as that of the parameter generation apparatus 1 of the first embodiment, and the configuration of the encryption unit 313 is the same as that of the encryption unit 313 of the third embodiment. Therefore, detailed descriptions of them are omitted here.

(2) Public Key Storage Unit 411

The public key storage unit 411 is a storage unit for receiving and storing the public key polynomial h of the decryption apparatus 42.

<Structure of Communication Channel 43>

The communication channel 43 is a secure communication channel that is used for receiving/transmitting the parameter set PS between the encryption apparatus 41 and the decryption apparatus 42.

<Configuration of Decryption Apparatus 42>

Figure 17:
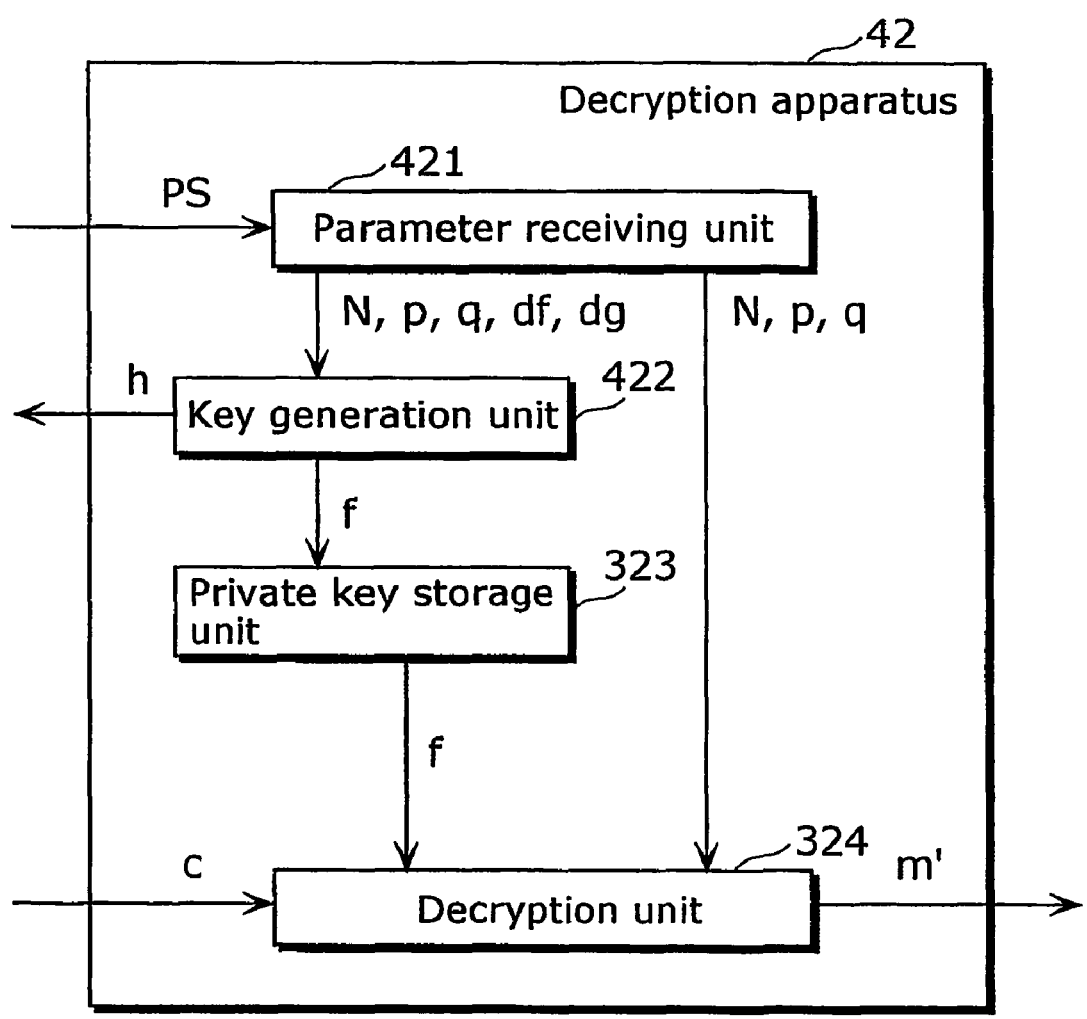
FIG. 17 is a diagram showing a configuration of a decryption apparatus 42 according to the fourth embodiment of the present invention.

Referring to FIG. 17, the decryption apparatus 42, which is an apparatus for determining a decrypted text polynomial m' by decrypting the encrypted text polynomial c, is comprised of a parameter receiving unit 421, a key generation unit 422, a private key storage unit 323, and a decryption unit 324.

(1) Parameter Receiving Unit 421

The parameter receiving unit 421 is a processing unit that receives the NTRU parameters generated by the parameter generation apparatus 1 of the encryption apparatus 41.

(2) Key Generation Unit 422

The key generation unit 422 is a processing unit that is configured to transmit the generated public key polynomial h to the encryption apparatus 41 via the communication channel 33, in addition to the configuration of the key generation unit 322 of the third embodiment.

(3) Private key storage unit 323 and decryption unit 324

The private key storage unit 323 and the decryption unit 324 are configured in the same manner as that of the first embodiment. Therefore, detailed descriptions of them are omitted here.

<Operation of Encryption System 4>

Figure 18:
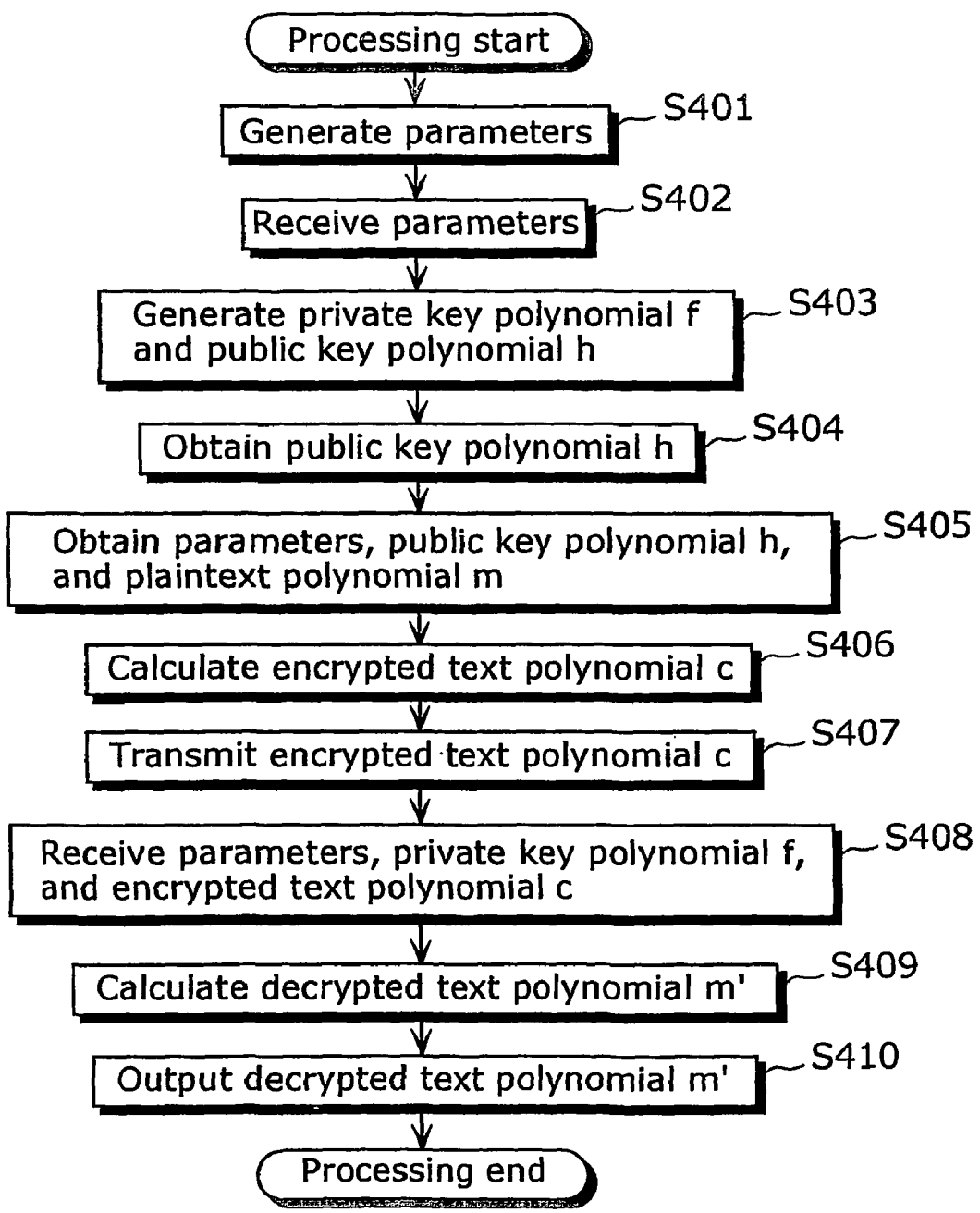
FIG. 18 is a flowchart showing an operation of the encryption system 4 according to the fourth embodiment of the present invention.

The following describes the operation of the encryption system 4 with the above configuration. FIG. 18 is a flowchart showing the operation of the encryption system 4.

The parameter generation apparatus 1 of the encryption apparatus 41 generates the NTRU parameters (parameter N, parameter p, parameter q, parameter d, parameter df, and parameter dg) (Step S401).

The parameter receiving unit 421 of the decryption apparatus 42 receives the parameter N, parameter p, parameter q, parameter df, and parameter dg from the parameter generation apparatus 1 (Step S402).

The key generation unit 422 obtains the parameter N, parameter p, parameter q, parameter df, and parameter dg from the parameter receiving unit 421, and generates the private key polynomial f and the public key polynomial h.

Then, the private key generation unit 422 transmits the public key polynomial h to the public key storage unit 411 of the encryption apparatus 41, whereas it stores the private key polynomial f into the private key storage unit 323 (Step S403).

The public key storage unit 411 of the encryption apparatus 41 obtains the public key polynomial h of the decryption apparatus 32 and stores it (Step S404).

The encryption unit 313 of the encryption apparatus 41 receives the parameter N, parameter p, parameter q, and parameter d from the parameter generation unit 1, receives the public key polynomial h from the public key storage unit 411, and receives, from outside, the plaintext polynomial m that is represented by a polynomial of degree (N−1) or lower with respect to the parameter N (Step S405).

Using the parameter N and the parameter d, the encryption unit 313 of the encryption apparatus 41 randomly chooses a random number polynomial r of degree (N−1) whose d coefficients equal to "1", d coefficients equal to "−1", and the other coefficients equal to "0". Then, the encryption unit 313 performs encryption of an NTRU cryptosystem on the plaintext polynomial m by use of the random number polynomial r, public key polynomial h, parameter N, parameter p, and parameter q, so as to determine the encrypted text polynomial c (Step S406).

The encryption unit 313 of the encryption apparatus 41 transmits the encrypted text polynomial c to the decryption apparatus 42 via the communication channel 33 (Step S407).

The decryption unit 324 of the decryption apparatus 42 receives the parameter N, parameter p, and parameter q from the parameter receiving unit 421, receives the private key polynomial f from the private key storage unit 323, and receives the encrypted text polynomial c from the encryption apparatus 41 via the communication channel 33 (Step S408).

The decryption unit 324 of the decryption apparatus 42 performs decryption of the NTRU cryptosystem on the encrypted text polynomial c by use of the private key polynomial f, parameter N, parameter p, and parameter q, so as to determine the decrypted text polynomial m' (Step S409).

Then, the decryption unit 324 of the decryption apparatus 42 outputs such decrypted text polynomial m' to the outside, and terminates the processing (Step S410).

According to the present embodiment, unlike the encryption system 3 of the third embodiment, encryption of the plaintext polynomial m and decryption of the encrypted text polynomial c are performed by using parameters that are dynamically generated by the parameter generation apparatus 1 of the encryption apparatus 1 instead of using parameters that are pre-generated and stored in the parameter storage units 311 and 421. This makes it possible to change parameters periodically and therefore to enhance the security of encrypted communications.

<Variations>

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein. The following variations are also included in the scope of the present invention.

(1) As FIG. 10 shows, more than one pair of a lattice constant GL and a decryption time evaluation formula EF may be stored in the formula storage unit 110, out of which the security judgment unit 105 may read out a pair of a decryption time evaluation formula EF and a lattice constant GL that satisfies GL≦SL.

Furthermore, it is possible that lattice constants GL and decryption time evaluation formulas EF stored in the formula storage unit 110 may be changed later.

(2) A method for choosing the parameter N employed by the first parameter generation unit 102 is not limited to the above-described method, and therefore any method is applicable as long as it is possible to take a sufficiently large value as the value of N. For example, the parameter N that satisfies N=L (SLI) for a monotone increasing function F such as F(x)=10·log(x), may be chosen. Furthermore, the parameter N may also be a fixed value.

(3) A method for choosing the parameters df, dg, and d employed by the second parameter generation unit 103 is not limited to the above-described method, and therefore any method is applicable as long as dg>d is satisfied and as long as the security level of the private key and the security level of plain texts against decryption by an exhaustive search are equivalent to the security level indicated by the security level information SLI.

(4) Moreover, as a method for generating the parameters q, df, dg, and d in the parameter set PS, in addition to the method in which the second parameter generation unit 103 chooses the parameters df, dg, and d using the above-described method and the third parameter generation unit 104 substitutes the values of such parameters df, dg, and d into the conditional expression ED so as to determine the value of the parameter q, such a method may be used as the one in which the parameters df, dg, and d are chosen so that df>d is satisfied based on a relational expression to be derived from the conditional expression ED and the value of a parameter q, which is provided in advance from the outside.

More specifically, suppose the case where the parameter q satisfying q=256 is previously provided from outside. In this case, the parameters q, df, dg, and d in the parameter set PS may be generated by choosing the parameter df, dg, and d that satisfy the following relational expression derived from the conditional expression ED and the value of the parameter q, and that satisfy dg>d:

$$6d+2df-1<128.$$

In this case, there is a possibility, however, with such parameters df, dg, and d, that decryption time needed to decrypt a private key and a plaintext by means of an exhaustive search, does not satisfy the security level indicated by the security level information SLI. Thus, after the parameter N is increased by the security enhancement unit 106 so that decryption time T needed to perform decryption using the LLL algorithm can achieve the security level indicated by the security level information SLI as described above, the parameter N may be increased so that decryption time needed to decrypt a private key and a plain text by means of an exhaustive search will be achieved, as has been described in the explanation of the configuration of the second parameter generation unit 103.

Furthermore, after the parameter N is increased so that decryption time needed to decrypt a private key and a plain text by means of an exhaustive search can achieve the security level indicated by the security level information SLI, the parameter N may be increased so that the decryption time T in the case of the LLL algorithm can achieve the security level indicated by the security level information SLI.

(5) A method for choosing the parameter q employed by the third parameter generation unit 104 is not limited to the above-described method, and therefore any method may be used as long as the chosen parameter q satisfies the conditional expression ED, and the parameter q and the parameter p are relatively prime.

(6) The parameter p generated by the first parameter generation unit 102 and the parameter p included in the parameter sets IPS and PS handled by the parameter conversion apparatus 2, are not limited to p=3, and therefore a parameter p that satisfies other equation may also be used.

For example, the same effect can be achieved if the conditional expression ED to be stored in the formula storage unit 110 is as follows, taking p=k in relation to a certain non-negative integer k:

ED: $2 \cdot k \cdot d + 2df - 1 < q/2$.

(7) In connection to the above variation (6), it is also possible that p=b for a certain polynomial b. For example, the same effect can be achieved if the conditional expression ED to be stored in the formula storage unit 110 is as follows, taking p=(X+2):

ED: $6d + 2df - 1 < q/2$.

This is because, no decryption error occurs if all coefficients in the polynomial $p \times r \times g + f \times m$ are within the range from $-q/2$ to $q/2$, as described above.

Here, thinking of the polynomial $r \times g$, the maximum coefficient value is $2d$ at greatest (the smallest value is not more than $-2d$).

Here, since p=(X+2), the use of a(k) to represent the coefficient of degree k of the polynomial a gives, $p(0)=2, p(1)=1, p(i)=0\ (i>1)$, and so, $(p \times (r \times g))(k)$ $= p(0) \cdot (r \times g)(k) + p(1) \cdot (r \times g)(k-1) +$ $\ldots + p(N-1) \cdot (r \times g)(k - (N-1)(\bmod N))$ $= (r \times g)(k) + 2 \cdot (r \times g)(k-1)$.

Therefore, the largest coefficient value of the polynomial $p \times r \times g$ is $3 \cdot 2d$. Meanwhile, the largest coefficient value of the polynomial $f \times m$ is $2df-1$ at greatest (the smallest value is not more than $-2df+1$).

Thus, as in the case of the above-described embodiments, it is possible to know that the largest coefficient value of the polynomial $p \times r \times g + f \times m$ is $3 \cdot 2d + 2df - 1$ at greatest, from which it is possible to derive the following expression as a conditional expression ED for generating parameters that do not cause any decryption errors in theory:

ED: $6d + 2df - 1 < q/2$.

Note that the polynomial b is not limited, of course, to b=(X+2). In this case, it is possible to derive the conditional expression ED by performing the above processing and therefore to achieve the same effect.

(8) In addition to the configuration in which the parameter conversion apparatus 2 receives the parameter set IPS from outside, the parameter conversion apparatus 2 may also hold a list of parameter sets IPS that achieve the security level indicated by the security level information SLI. In this case, data inputted to the input unit 101*b* from outside is only the security level information SLI. Stated another way, the input unit 101*b* holds a list of parameter sets IPS as shown in FIG. 9, and when receiving security level information SLI from outside, it outputs, to the third parameter generation unit 105, the parameter set IPS, as a parameter set PS, that is associated with such SLI.

(9) Document 4 describes about the possibility that decryption time in the case of using the LLL algorithm is shortened, if Zero-Run Lattice is used for decryption. Decryption time in the case of using the LLL algorithm may be evaluated, therefore, by using a decryption time evaluation formula EF that takes into account decryption using such Zero-Run Lattice.

(10) In the encryption system 3, the private key polynomial f and the public key polynomial h may not have to be generated by the key generation unit 322 of the decryption apparatus 32. For example, it is also possible that the private key polynomial f and the public key polynomial h may be generated outside the decryption apparatus 32, such as by a key management server, and then be inputted to the private key storage unit 323 and the public key storage unit 312, respectively.

(11) The encryption system 3 may further includes the parameter generation apparatus 1 or the parameter conversion apparatus 2, and NTRU parameters outputted by the parameter generation apparatus 1 or the parameter conversion apparatus 2 may be inputted to the parameter storage unit 311 or 321.

(12) The encryption system 3 may also have the configuration in which the encryption apparatus 31 is further equipped with the parameter generation apparatus 1 or the parameter conversion apparatus 2. In this case, the encryption apparatus 31 generates NTRU parameters, which are then inputted to the parameter storage unit 311 and transmitted to the decryption apparatus 32 via the communication channel 33. Then, the decryption apparatus 32 receives such NTRU parameters, and stores them into the parameter storage unit 321.

(13) NTRU parameters to be stored into the parameter storage unit 311 may be any parameters as long as such parameters include at least the parameter N, parameter p, parameter q, and parameter d out of the parameters N, p, q, df, dg, and d. Also, NTRU parameters to be stored into the parameter storage unit 321 may be any parameters as long as such parameters include at least the parameter N, parameter p, parameter q, parameter df, and parameter dg. For example, it is possible that p=2. In this case, all coefficients in all polynomials shall equal to 1 or 0. This makes it possible to perform operations between polynomials at higher-speed, and consequently to perform processing for parameter generation, parameter conversion, encryption, and decryption at higher-speed.

(14) In the encryption apparatus 41 in the encryption system 4 according to the fourth embodiment, the parameter conversion apparatus 2 may be used instead of the parameter generation apparatus 1.

(15) Instead of the parameter generation apparatus 1, the encryption apparatus 41 in the encryption system 4 presented in the fourth embodiment may be equipped with a parameter receiving apparatus for receiving parameters that are equivalent to those generated by the parameter generation apparatus 1.

(16) The present invention may be embodied as methods by which it is possible to achieve the effects presented in the respective embodiments described above. Moreover, the present invention may be embodied as computer programs including such methods to be executed by a computer and as a digital signal that is comprised of such computer program.

Furthermore, the present invention may also be embodied as a computer-readable recording medium, such as a semiconductor memory, hard disk drive, CD-ROM, DVD-ROM (Digital Versatile Disc-ROM) and DVD-RAM, on which the above computer programs or digital signal is recorded.

(17) The present invention may also be embodied as a combination of some of the above embodiments and variations.

INDUSTRIAL APPLICABILITY

The present invention is applicable to encryption processing and decryption processing, and particularly to digital signature, electronic authentication technique, and encrypted communication, and the like.

The invention claimed is:

1. A parameter generation apparatus for generating an output parameter, the output parameter being a set of parameters causing no decryption error for an NTRU cryptosystem, the parameter generation apparatus comprising:
an error-free output parameter generation unit operable to generate the output parameter causing no decryption error based on error condition information that is provided in advance, the error condition information indicating a condition for causing no decryption error,
wherein the error condition information is a conditional expression indicating the condition for causing no decryption error, and
wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

2. The parameter generation apparatus according to claim 1,
wherein the error-free output parameter generation unit includes:
a provisional parameter generation unit operable to generate a set of provisional parameters causing no decryption error based on the error condition information; and
an output parameter generation unit operable to generate the output parameter, using the set of provisional parameters, based on a lattice constant that is calculated from the set of provisional parameters.

3. The parameter generation apparatus according to claim 2,
wherein the provisional parameter generation unit generates the set of provisional parameters causing no decryption error based on an input parameter and the error condition information, the input parameter being a set of parameters for the NTRU cryptosystem that are inputted from outside.

4. The parameter generation apparatus according to claim 2,
wherein the output parameter generation unit generates the output parameter, using the set of provisional parameters, based on security determination information and security level information, the security determination information being associated with the lattice constant, and the security level information indicating a level of security against decryption performed by a third party.

5. The parameter generation apparatus according to claim 4,
wherein the output parameter generation unit includes a security determination information holding unit operable to hold the security determination information, and wherein the security determination information is provided from outside.

6. The parameter generation apparatus according to claim 4,
wherein the output parameter generation unit includes a lattice constant storage unit operable to store one or more lattice constant and security determination information pairs, and
wherein the lattice constant and the security determination information are provided from outside.

7. The parameter generation apparatus according to claim 6,
wherein the output parameter generation unit further includes a security determination information selection unit operable to select security determination information from the one or more lattice constant and security determination pairs stored in the lattice constant storage unit based on the lattice constant, and
the output parameter generation unit generates the output parameter using the selected security determination information and the lattice constant that is paired with the selected security determination information.

8. The parameter generation apparatus according to claim 6,
wherein the output parameter generation unit includes:
a modification judgment unit operable to judge whether to modify the set of provisional parameters based on the lattice constant and the security determination information;
a provisional parameter modification unit operable to generate a modified set of provisional parameters using the set of provisional parameters when the modification unit judges that the set of provisional parameters should be modified; and
a generation unit operable to generate the output parameter, using the modified set of provisional parameters, based on the security level information.

9. The parameter generation apparatus according to claim 8,
wherein the provisional parameter modification unit generates the modified set of provisional parameters by modifying a non-negative integer dg, included in the set of provisional parameters, for specifying the number of coefficients in a random polynomial g whose coefficient values equal to 1, the random polynomial g being used for generating a public key polynomial.

10. The parameter generation apparatus according to claim 2,
wherein the set of provisional parameters and the output parameter are each made up of a set of the following: a degree N in the NTRU cryptosystem; the non-negative integer p; the non-negative integer q; the non-negative integer df for specifying the number of coefficients in the private key polynomial f whose coefficient values equal to 1; a non-negative integer dg for specifying the number of coefficients in a random polynomial g whose coefficient values equal to 1, the random polynomial g being used for generating a public key polynomial; and the non-negative integer d for specifying the number of coefficients in a random number polynomial r whose coefficient values equal to 1, the random number polynomial r being used for encrypting a plain text.

11. The parameter generation apparatus according to claim 10,
wherein the provisional parameter generation unit includes an initial security determination information holding unit operable to hold initial security determination information that is associated with time needed to perform decryption, and wherein the provisional parameter generation unit generates the degree N included in the set of provisional parameters based on the security level information and the initial security determination information.

12. The parameter generation apparatus according to claim 10, wherein the provisional parameter generation unit generates the non-negative integer df, the non-negative integer dg, and the non-negative integer d that are included in the set of provisional parameters based on the security level information and the degree N.

13. The parameter generation apparatus according to claim 10, wherein the provisional parameter generation unit generates the non-negative integer q included in the set of provisional parameters based on the error condition information.

14. The parameter generation apparatus according to claim 10, wherein the output parameter generation unit generates the degree N included in the output parameter based on the security level information and the security determination information.

15. The parameter generation apparatus according to claim 1, wherein the NTRU cryptosystem is an encryption system for encrypting a plain text and decrypting an encrypted text by a method comprising the following steps:

a selection step of selecting ideals p and q of a ring R that is a group of arrays of dimension N in which addition, subtraction and multiplication are defined;

a generation step of generating elements f and g of the ring R, and generating element F.sub.q which is an inverse of f (mod q), and generating element F.sub.p which is an inverse of f (mod p);

a public key production step of producing a public key that includes h, where h is congruent, mod q, to a product that can be derived using g and F.sub.q;

a private key production step of producing, as a private key, information from which f and F.sub.p can be derived;

an encryption step of producing the encrypted text by encoding the plain text using the public key and element i that is randomly selected from the ring R; and a decryption step of producing a decrypted text by decrypting the encrypted text using the private key.

16. An encryption system for generating an encrypted text by encrypting a plain text in compliance with an NTRU cryptosystem, the encryption system comprising:

a parameter generation apparatus that includes an error-free output parameter generation unit operable to generate an output parameter causing no decryption error based on error condition information that is provided in advance, the error condition information indicating a condition for causing no decryption error;

a public key generation unit operable to generate a public key based on the output parameter generated by the parameter generation apparatus; and an encryption unit operable to encrypt the plain text based on the public key, wherein the error condition information is a conditional expression indicating the condition for causing no decryption error, and wherein the conditional expression is represented as 2·p·d+ 2df−1<q/2, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

17. A decryption system for generating a decrypted text by decrypting an encrypted text in compliance with an NTRU cryptosystem, the decryption system comprising:

a parameter generation apparatus that includes an error-free output parameter generation unit operable to generate an output parameter causing no decryption error based on error condition information that is provided in advance, the error condition information indicating a condition for causing no decryption error;

a private key generation unit operable to generate a private key based on the output parameter generated by the parameter generation apparatus; and a decryption unit operable to decrypt the encrypted text based on the private key, wherein the error condition information is a conditional expression indicating the condition for causing no decryption error, and wherein the conditional expression is represented as 2·p·d+ 2df−1<q/2, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

18. An encryption system using an NTRU cryptosystem, the encryption system comprising:

a parameter generation apparatus for generating and outputting an output parameter that is a set of parameters causing no decryption error for the NTRU cryptosystem;

a key generation apparatus for generating and outputting an encryption key and a decryption key for the NTRU cryptosystem;

an encryption apparatus for generating an encrypted text by encrypting a plain text in compliance with the NTRU cryptosystem; and a decryption apparatus for generating a decrypted text by decrypting the encrypted text, wherein the parameter generation apparatus includes:

a provisional parameter generation unit operable to generate a set of provisional parameters causing no decryption error based on error condition information that is provided in advance, the error condition information indicating a condition for causing no decryption error; and an output parameter generation unit operable to generate the output parameter, using the set of provisional parameters, based on a lattice constant that is calculated from the set of provisional parameters, and output the generated output parameter, wherein the key generation apparatus includes a generated key output unit operable to generate the encryption key and the decryption key using the output parameter inputted from the parameter generation apparatus, and output the generated encryption key and decryption key, wherein the encryption apparatus includes an encryption unit operable to generate the encrypted text by encrypting the plain text using the output parameter inputted from the parameter generation apparatus and the encryption key inputted from the key generation apparatus, wherein the decryption apparatus includes a decryption unit operable to generate the decrypted text by decrypting the encrypted text using the output parameter inputted from the parameter generation apparatus and the decryption key inputted from the key generation apparatus, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

19. An encryption system using an NTRU cryptosystem, the encryption system comprising:
a parameter generation apparatus for generating and outputting an output parameter that is a set of parameters causing no decryption error for the NTRU cryptosystem;
a key generation apparatus for generating and outputting an encryption key for the NTRU cryptosystem; and
an encryption apparatus for generating an encrypted text by encrypting a plain text in compliance with the NTRU cryptosystem,
wherein the parameter generation apparatus includes:
a provisional parameter generation unit operable to generate a set of provisional parameters causing no decryption error based on error condition information that is provided in advance, the error condition information indicating a condition for causing no decryption error; and
an output parameter generation unit operable to generate the output parameter, using the set of provisional parameters, based on a lattice constant that is calculated from the set of provisional parameters, and output the generated output parameter,
wherein the key generation apparatus includes a generated key output unit operable to generate the encryption key using the output parameter inputted from the parameter generation apparatus, and output the generated encryption key,
wherein the encryption apparatus includes an encryption unit operable to generate the encrypted text by encrypting the plain text using the output parameter inputted from the parameter generation apparatus and the encryption key inputted from the key generation apparatus,
wherein the error condition information is a conditional expression indicating the condition for causing no decryption error, and
wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

20. An encryption apparatus for generating an encrypted text by encrypting a plain text in compliance with an NTRU cryptosystem, the encryption apparatus comprising:
a provisional parameter generation unit operable to generate a set of provisional parameters causing no decryption error based on error condition information that is provided in advance, the error condition information indicating a condition for causing no decryption error;
an output parameter generation unit operable to generate an output parameter, using the set of provisional parameters, based on a lattice constant that is calculated from the set of provisional parameters, and output the generated output parameter, the output parameter being a set of parameters causing no decryption error for the NTRU cryptosystem;
a parameter transmission unit operable to transmit the output parameter to a decryption apparatus;
an encryption key receiving unit operable to receive, from the decryption apparatus, an encryption key for the NTRU cryptosystem that is generated based on the output parameter; and
an encrypted text generation unit operable to generate the encrypted text by encrypting the plain text based on the output parameter and the encryption key,
wherein the error condition information is a conditional expression indicating the condition for causing no decryption error, and
wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

21. An encryption apparatus for generating an encrypted text by encrypting a plain text in compliance with an NTRU cryptosystem, the encryption apparatus comprising:
a parameter receiving unit operable to receive an output parameter causing no decryption error and generated based on error condition information that is provided in advance, the error condition information indicating a condition for causing no decryption error;
a public key generation unit operable to generate a public key based on the output parameter received by the parameter receiving unit; and
an encryption unit operable to encrypt the plain text based on the public key,
wherein the error condition information is a conditional expression indicating the condition for causing no decryption error, and
wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

22. An encryption method for generating an encrypted text by encrypting a plain text in compliance with NTRU cryptosystem, the encryption method comprising the steps of:
generating a set of provisional parameters causing no decryption error based on error condition information that is provided in advance, the error condition information indicating a condition for causing no decryption error;
generating an output parameter, using the set of provisional parameters, based on a lattice constant that is calculated from the set of provisional parameters, and outputting the generated output parameter, the generated output parameter being a set of parameters causing no decryption error for the NTRU cryptosystem;
generating an encryption key for the NTRU cryptosystem based on the output parameter; and
generating the encrypted text by encrypting the plain text based on the output parameter and the encryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

23. A non-transitory computer-readable recording medium having stored thereon a program for generating an encrypted text by encrypting a plain text in compliance with NTRU cryptosystem, wherein when executed, the program causes a computer to perform a method comprising the steps of:

generating a set of provisional parameters causing no decryption error based on error condition information that is provided in advance, the error condition information indicating a condition for causing no decryption error;

generating an output parameter, using the set of provisional parameters, based on a lattice constant that is calculated from the set of provisional parameters, and outputting the generated output parameter, the generated output parameter being a set of parameters causing no decryption error for the NTRU cryptosystem;

generating an encryption key for the NTRU cryptosystem based on the output parameter; and generating the encrypted text by encrypting the plain text based on the output parameter and the encryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

24. A decryption system using an NTRU cryptosystem, the decryption system comprising:

a parameter generation apparatus for generating and outputting an output parameter that is a set of parameters causing no decryption error for the NTRU cryptosystem;

a key generation apparatus for generating and outputting a decryption key for the NTRU cryptosystem; and a decryption apparatus for generating a decrypted text by decrypting an encrypted text in compliance with the NTRU cryptosystem, wherein the parameter generation apparatus includes:

a provisional parameter generation unit operable to generate a set of provisional parameters causing no decryption error based on error condition information that is provided in advance, the error condition information indicating a condition for causing no decryption error; and an output parameter generation unit operable to generate the output parameter, using the set of provisional parameters, based on a lattice constant that is calculated from the set of provisional parameters, and output the generated output parameter, the key generation apparatus includes a generated key output unit operable to generate the decryption key using the output parameter inputted from the parameter generation apparatus, and output the generated decryption key, the decryption apparatus includes a decryption unit operable to generate the decrypted text by decrypting the encrypted text using the output parameter inputted from the parameter generation apparatus and the decryption key inputted from the key generation apparatus, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

25. A decryption apparatus for generating a decrypted text by decrypting an encrypted text received from an encryption apparatus in compliance with an NTRU cryptosystem, the decryption apparatus comprising:

a parameter receiving unit operable to receive, from the encryption apparatus, an output parameter, the output parameter being a set of parameters causing no decryption error for the NTRU cryptosystem;

a generated key generation unit operable to generate an encryption key and a decryption key for the NTRU cryptosystem using the inputted output parameter, and output the generated encryption key and decryption key;

an encryption key transmission unit operable to transmit the encrypted key to the encryption apparatus; and a decrypted text generation unit operable to generate the decrypted text by decrypting the encrypted text based on the output parameter and the decryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

26. A decryption method for generating a decrypted text by decrypting an encrypted text in compliance with NTRU cryptosystem, the decryption method comprising the steps of:

generating a set of provisional parameters causing no decryption error based on error condition information that is provided in advance, the error condition information indicating a condition for causing no decryption error;

generating an output parameter, using said set of provisional parameters, based on a lattice constant that is calculated from the set of provisional parameters, and outputting the generated output parameter, the generated output parameter being a set of parameters causing no decryption error for the NTRU cryptosystem;

generating a decryption key for the NTRU cryptosystem based on the output parameter; and generating the decrypted text by decrypting the encrypted text based on the output parameter and the decryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

27. A non-transitory computer readable recording medium having stored thereon a program for generating a decrypted text by decrypting an encrypted text in compliance with NTRU cryptosystem, wherein when executed, the program causes a computer to perform a method comprising the steps of:

generating a set of provisional parameters causing no decryption error based on error condition information that is provided in advance, the error condition information indicating a condition for causing no decryption error;

generating an output parameter, using the set of provisional parameters, based on a lattice constant that is calculated from the set of provisional parameters, and outputting the generated output parameter, the generated output parameter being a set of parameters causing no decryption error for the NTRU cryptosystem;

generating a decryption key for the NTRU cryptosystem based on the output parameter; and generating the decrypted text by decrypting the encrypted text based on the output parameter and the decryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

28. An encryption system using an NTRU cryptosystem, the encryption system comprising:

a parameter conversion apparatus for converting, into an output parameter, an input parameter that is a set of parameters for the NTRU cryptosystem that are inputted from outside, the output parameter being a set of parameters causing no decryption error for the NTRU cryptosystem;

a key generation apparatus for generating and outputting an encryption key and a decryption key for the NTRU cryptosystem;

an encryption apparatus for generating an encrypted text by encrypting a plain text in compliance with the NTRU cryptosystem; and a decryption apparatus for generating a decrypted text by decrypting the encrypted text, wherein the parameter conversion apparatus includes:

a provisional parameter generation unit operable to generate a set of provisional parameters causing no decryption error based on the input parameter and error condition information that is provided in advance, the error condition information indicating a condition for causing no decryption error; and an output parameter generation unit operable to generate the output parameter, using the set of provisional parameters, based on a lattice constant that is calculated from the set of provisional parameters, and output the generated output parameter, wherein the key generation apparatus includes a generated key output unit operable to generate the encryption key and the decryption key using the output parameter inputted from the parameter conversion apparatus, and output the generated encryption key and decryption key, wherein the encryption apparatus includes an encryption unit operable to generate the encrypted text by encrypting the plain text using the output parameter inputted from the parameter conversion apparatus and the encryption key inputted from the key generation apparatus, wherein the decryption apparatus includes a decryption unit operable to generate the decrypted text by decrypting the encrypted text using the output parameter inputted from the parameter conversion apparatus and the decryption key inputted from the key generation apparatus, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

29. An encryption system using an NTRU cryptosystem, the encryption system comprising:

a parameter generation apparatus for generating an output parameter from an input parameter that is a set of parameters for the NTRU cryptosystem that are inputted from outside, and outputting the generated output parameter, the generated output parameter being a set of parameters causing no decryption error for the NTRU cryptosystem;

a key generation apparatus for generating and outputting an encryption key for the NTRU cryptosystem; and an encryption apparatus for generating an encrypted text by encrypting a plain text in compliance with the NTRU cryptosystem, wherein the parameter generation apparatus includes:

a provisional parameter generation unit operable to generate a set of provisional parameters causing no decryption error based on the input parameter and error condition information that is provided in advance, the error condition information indicating a condition for causing no decryption error; and an output parameter generation unit operable to generate the output parameter, using the set of provisional parameters, based on a lattice constant that is calculated from the set of provisional parameters, and output the generated output parameter, wherein the key generation apparatus includes a generated key output unit operable to generate the encryption key using the output parameter inputted from the parameter generation apparatus, and output the generated encryption key, wherein the encryption apparatus includes an encryption unit operable to generate the encrypted text by encrypting the plain text using the output parameter inputted from the parameter generation apparatus and the encryption key inputted from the key generation apparatus, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

30. An encryption apparatus for generating an encrypted text by encrypting a plain text in compliance with an NTRU cryptosystem, the encryption apparatus comprising:

a provisional parameter generation unit operable to generate a set of provisional parameters causing no decryption error based on an input parameter that is a set of parameters for the NTRU cryptosystem and error condition information indicating a condition for causing no decryption error, the input parameter and the error condition information being provided in advance;

an output parameter generation unit operable to generate an output parameter, using the set of provisional parameters, based on a lattice constant that is calculated from the set of provisional parameters, and output the generated output parameter, the generated output parameter being a set of parameters causing no decryption error for the NTRU cryptosystem;

a parameter transmission unit operable to transmit the output parameter to a decryption apparatus;

an encryption key receiving unit operable to receive, from the decryption apparatus, an encryption key for the NTRU cryptosystem that is generated based on the output parameter; and an encrypted text generation unit operable to generate the encrypted text by encrypting the plain text based on the output parameter and the encryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

31. An encryption method for generating an encrypted text by encrypting a plain text in compliance with NTRU cryptosystem, the encryption method comprising the steps of:

generating a set of provisional parameters causing no decryption error based on an input parameter that is a set of parameters for the NTRU cryptosystem and error condition information indicating a condition for causing no decryption error, the input parameter and the error condition information being provided in advance;

generating an output parameter, using the set of provisional parameters, based on a lattice constant that is calculated from the set of provisional parameters, and outputting the generated output parameter, the generated output parameter being a set of parameters causing no decryption error for the NTRU cryptosystem;

generating an encryption key for the NTRU cryptosystem based on the output parameter; and generating the encrypted text by encrypting the plain text based on the output parameter and the encryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

32. A non-transitory computer readable recording medium having stored thereon a program for generating an encrypted text by encrypting a plain text in compliance with NTRU cryptosystem, wherein when executed, the program causes a computer to perform a method comprising the steps of:

generating a set of provisional parameters causing no decryption error based on an input parameter that is a set of parameters for the NTRU cryptosystem and error condition information indicating a condition for causing no decryption error, the input parameter and the error condition information being provided in advance;

generating an output parameter, using the set of provisional parameters, based on a lattice constant that is calculated from the set of provisional parameters, and outputting the generated output parameter, the generated output parameter being a set of parameters causing no decryption error for the NTRU cryptosystem;

generating an encryption key for the NTRU cryptosystem based on the output parameter; and generating the encrypted text by encrypting the plain text based on the output parameter and the encryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

33. A decryption system using an NTRU cryptosystem, the decryption system comprising:

a parameter generation apparatus for generating an output parameter from an input parameter that is a set of parameters for the NTRU cryptosystem that are inputted from outside, and outputting the generated output parameter, the generated output parameter being a set of parameters causing no decryption error for the NTRU cryptosystem;

a key generation apparatus for generating and outputting a decryption key for the NTRU cryptosystem; and a decryption apparatus for generating a decrypted text by decrypting an encrypted text in compliance with the NTRU cryptosystem, wherein the parameter generation apparatus includes:

a provisional parameter generation unit operable to generate a set of provisional parameters causing no decryption error based on the input parameter and error condition information that is provided in advance, the error condition information indicating a condition for causing no decryption error; and an output parameter generation unit operable to generate the output parameter, using the set of provisional parameters, based on a lattice constant that is calculated from the set of provisional parameters, and output the generated output parameter, wherein the key generation apparatus includes a generated key output unit operable to generate the decryption key using the output parameter inputted from the parameter generation apparatus, and output the generated decryption key, wherein the decryption apparatus includes a decryption unit operable to generate the decrypted text by decrypting the encrypted text using the output parameter inputted from the parameter generation apparatus and the decryption key inputted from the key generation apparatus, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

34. A decryption method for generating a decrypted text by decrypting an encrypted text in compliance with NTRU cryptosystem, the decryption method comprising the steps of:

generating a set of provisional parameters causing no decryption error based on an input parameter that is a set of parameters for the NTRU cryptosystem and error condition information indicating a condition for causing no decryption error, the input parameter and the error condition information being provided in advance;

generating an output parameter, using the set of provisional parameters, based on a lattice constant that is calculated from the set of provisional parameters, and outputting the generated output parameter, the generated output parameter being a set of parameters causing no decryption error for the NTRU cryptosystem;

generating a decryption key for the NTRU cryptosystem based on the output parameter; and generating the decrypted text by decrypting the encrypted text based on the output parameter and the decryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

35. A non-transitory computer readable recording medium having stored thereon a program for generating a decrypted text by decrypting an encrypted text in compliance with NTRU cryptosystem, wherein when executed, the program causes computer to perform a method comprising the steps of:

generating a set of provisional parameters causing no decryption error based on an input parameter that is a set of parameters for the NTRU cryptosystem and error condition information indicating a condition for causing no decryption error, the input parameter and the error condition information being provided in advance;

generating an output parameter, using the set of provisional parameters, based on a lattice constant that is calculated from the set of provisional parameters, and outputting the generated output parameter, the generated output parameter being a set of parameters causing no decryption error for the NTRU cryptosystem;

generating a decryption key for the NTRU cryptosystem based on the output parameter; and generating the decrypted text by decrypting the encrypted text based on the output parameter and the decryption key, wherein the error condition information is a conditional expression indicating the condition for causing no decryption error, and wherein the conditional expression is represented as $2 \cdot p \cdot d + 2df - 1 < q/2$, with respect to a non-negative integer p, a non-negative integer q, a non-negative integer d, and a non-negative integer df, the non-negative integer df specifying the number of coefficients in a private key polynomial f whose coefficient values equal to 1, and the non-negative integers being parameters for use in the NTRU cryptosystem.

* * * * *

UNITED STATES PATENT AND TRADEMARK OFFICE
CERTIFICATE OF CORRECTION

PATENT NO. : 7,929,688 B2  Page 1 of 1
APPLICATION NO. : 10/552586
DATED : April 19, 2011
INVENTOR(S) : Yamamichi et al.

It is certified that error appears in the above-identified patent and that said Letters Patent is hereby corrected as shown below:

On title page, in Item (75), line 6, change "Macbashi (JP); Yuichi Futa, Osaka (JP); to -- Maebashi (JP); Yuichi Futa, Osaka (JP)--

Signed and Sealed this

Thirteenth Day of September, 2011

David J. Kappos
*Director of the United States Patent and Trademark Office*